(12) United States Patent
Kojima et al.

(10) Patent No.: US 12,247,933 B2
(45) Date of Patent: Mar. 11, 2025

(54) X-RAY PHASE IMAGING APPARATUS AND X-RAY PHASE IMAGING METHOD

(71) Applicant: Shimadzu Corporation, Kyoto (JP)

(72) Inventors: Kana Kojima, Kyoto (JP); Yuto Maeda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 107 days.

(21) Appl. No.: 18/363,168

(22) Filed: Aug. 1, 2023

(65) Prior Publication Data

US 2024/0102946 A1 Mar. 28, 2024

(30) Foreign Application Priority Data

Sep. 27, 2022 (JP) ................. 2022-154009

(51) Int. Cl.
*G01N 23/041* (2018.01)
*G01N 23/083* (2018.01)

(52) U.S. Cl.
CPC ......... *G01N 23/041* (2018.02); *G01N 23/083* (2013.01); *G01N 2223/3306* (2013.01)

(58) Field of Classification Search
CPC .............. G01N 23/041; G01N 23/083; G01N 2223/3306
See application file for complete search history.

(56) References Cited

U.S. PATENT DOCUMENTS

| | | | |
|---|---|---|---|
| 2015/0182178 A1* | 7/2015 | Baturin | A61B 6/4291 378/36 |
| 2020/0333265 A1 | 10/2020 | Doki et al. | |
| 2021/0137476 A1* | 5/2021 | Sano | A61B 6/582 |

FOREIGN PATENT DOCUMENTS

| | | | |
|---|---|---|---|
| JP | 2012-016370 A | 1/2012 | |
| JP | 2020-176980 A | 10/2020 | |

* cited by examiner

*Primary Examiner* — Dani Fox
*Assistant Examiner* — Mamadou Faye
(74) *Attorney, Agent, or Firm* — Maier & Maier, PLLC

(57) ABSTRACT

An X-ray phase imaging apparatus includes a control device configured or programmed to make a notification prompting a user to update or generate a corresponding second X-ray image when determining that a decrease in an image quality of an X-ray phase contrast image generated based on a first X-ray image obtained by imaging a subject and a second X-ray image obtained by imaging without the subject arranged does not fall within a predetermined allowable range and/or determining that the second X-ray image associated with an imaging condition has not been stored.

11 Claims, 11 Drawing Sheets

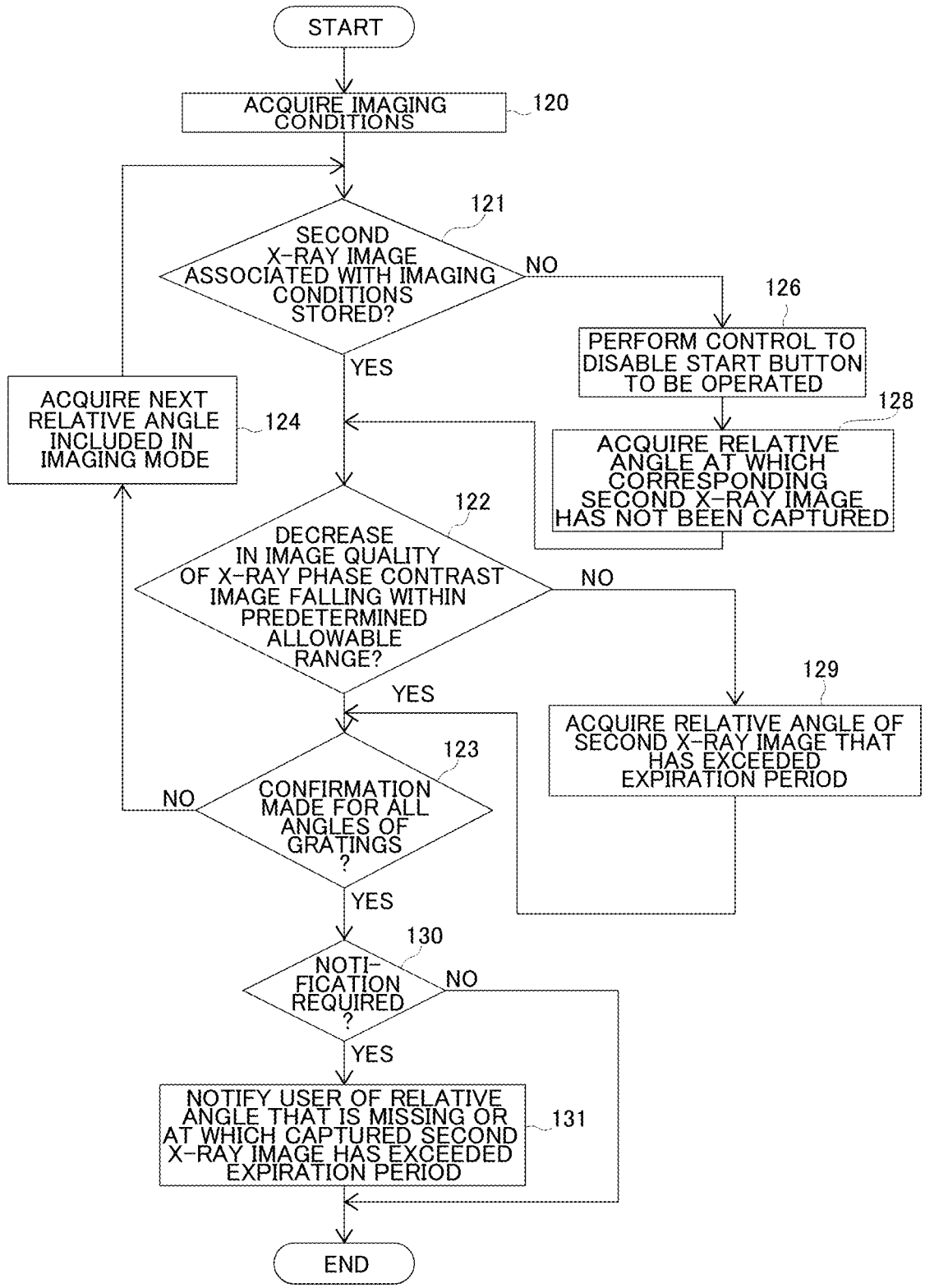
FIG.16 (MODIFIED EXAMPLE)

X-RAY PHASE IMAGING APPARATUS AND X-RAY PHASE IMAGING METHOD

CROSS-REFERENCE TO RELATED APPLICATIONS

This application claims the benefit of priority to Japanese Patent Application No. 2022-154009 filed on Sep. 27, 2022. The entire contents of this application are hereby incorporated herein by reference.

FIELD

The present invention relates to an X-ray phase imaging apparatus and an X-ray phase imaging method, and more particularly, it relates to an X-ray phase imaging apparatus including a plurality of gratings and an X-ray phase imaging method.

BACKGROUND

Conventionally, an X-ray phase imaging apparatus including a plurality of gratings is known. Such an X-ray phase imaging apparatus is disclosed in Japanese Patent Laid-Open No. 2012-016370, for example.

Japanese Patent Laid-Open No. 2012-016370 discloses an X-ray imaging apparatus including an X-ray source, a plurality of gratings, and an X-ray image detector. In the X-ray imaging apparatus disclosed in Japanese Patent Laid-Open No. 2012-016370, the X-ray source, the plurality of gratings, and the X-ray image detector are arranged at predetermined relative positions, and an image is captured while one of the plurality of gratings is translated in a direction of a grating pitch such that an absorption image, a differential phase image, and a dark field image are generated. Specifically, Japanese Patent Laid-Open No. 2012-016370 discloses a configuration in which an absorption image, a differential phase image, and a dark field image are generated based on a difference between moire interference fringes imaged while one of the plurality of gratings is translated without a subject arranged and moire interference fringes imaged while one of the plurality of gratings is translated with a subject arranged.

Although not disclosed in Japanese Patent Laid-Open No. 2012-016370, the moire interference fringes (second X-ray image) imaged without a subject arranged do not need to be imaged each time the moire interference fringes (first X-ray image) imaged with a subject arranged are imaged. For example, the second X-ray image can be captured in advance and stored in a storage or the like, and used when an X-ray phase contrast image including an absorption image, a differential phase image, and a dark field image is generated. The image quality of the generated X-ray phase contrast image may be decreased due to changes in the relative positions of the plurality of gratings, for example. In order to reduce or prevent a decrease in the image quality of the X-ray phase contrast image, it is conceivable to update the second X-ray image stored in the storage. However, Japanese Patent Laid-Open No. 2012-016370 does not disclose a configuration in which the X-ray imaging apparatus (X-ray phase imaging apparatus) updates the second X-ray image. Although not disclosed in Japanese Patent Laid-Open No. 2012-016370, the X-ray phase contrast image cannot be generated when the second X-ray image corresponding to the first X-ray image does not exist. Therefore, in an X-ray phase imaging apparatus as disclosed in Japanese Patent Laid-Open No. 2012-016370, it is difficult for a user to know the timing of updating a second X-ray image and/or the need to generate the second X-ray image.

SUMMARY

The present invention is intended to solve at least one of the above problems. The present invention aims to provide an X-ray phase imaging apparatus and an X-ray phase imaging method that each enable a user to easily know the timing of updating a second X-ray image and/or the need to generate the second X-ray image.

In order to attain the aforementioned object, an X-ray phase imaging apparatus according to a first aspect of the present invention includes an X-ray source configured to emit X-rays, an X-ray detector configured to detect the X-rays emitted from the X-ray source, a plurality of gratings arranged between the X-ray source and the X-ray detector, an image processor configured to acquire a first X-ray image obtained by imaging a subject according to a set imaging condition and a second X-ray image obtained by imaging without the subject arranged according to the set imaging condition, and generate an X-ray phase contrast image based on the first X-ray image and the second X-ray image, a storage configured to store the second X-ray image generated by the image processor in association with the imaging condition, and a control device configured or programmed to determine whether or not a decrease in an image quality of the X-ray phase contrast image generated using the second X-ray image stored in the storage, the second X-ray image being associated with the imaging condition of the first X-ray image to be acquired, falls within a predetermined allowable range and/or whether or not the second X-ray image associated with the imaging condition of the first X-ray image to be acquired has been stored in the storage, and make a notification prompting a user to update or generate the second X-ray image corresponding to the imaging condition of the first X-ray image to be acquired when determining that the decrease in the image quality of the X-ray phase contrast image generated using the second X-ray image associated with the imaging condition of the first X-ray image to be acquired does not fall within the allowable range and/or determining that the second X-ray image associated with the imaging condition of the first X-ray image to be acquired has not been stored in the storage.

An X-ray phase imaging method according to a second aspect of the present invention is for generating an X-ray phase contrast image based on a first X-ray image obtained by imaging a subject according to a set imaging condition and a second X-ray image obtained by imaging without the subject arranged according to the set imaging condition, and includes determining whether or not a decrease in an image quality of the X-ray phase contrast image generated using the second X-ray image stored in a storage, the second X-ray image being associated with the imaging condition of the first X-ray image to be acquired, falls within a predetermined allowable range and/or whether or not the second X-ray image associated with the imaging condition of the first X-ray image to be acquired has been stored in the storage, and making a notification prompting a user to update or generate the second X-ray image corresponding to the imaging condition of the first X-ray image to be acquired when it is determined that the decrease in the image quality of the X-ray phase contrast image generated using the second X-ray image associated with the imaging condition of the first X-ray image to be acquired does not fall within the allowable range and/or it is determined that the second X-ray image associated with the imaging condition of the first X-ray image to be acquired has not been stored in the storage.

In the X-ray phase imaging apparatus according to the first aspect and the X-ray phase imaging method according to the second aspect, as described above, a notification prompting the user to update the second X-ray image is made when it is determined that the decrease in the image quality of the X-ray phase contrast image generated using the second X-ray image stored in the storage and associated with the imaging condition of the first X-ray image to be acquired does not fall within the predetermined allowable range. Therefore, the notification allows the user to understand that the second X-ray image needs to be updated. Furthermore, as described above, a notification prompting the user to generate the second X-ray image corresponding to the imaging condition of the first X-ray image to be acquired is made when it is determined that the second X-ray image associated with the imaging condition of the first X-ray image to be acquired has not been stored in the storage. This allows the user to understand that the second X-ray image needs to be generated. Consequently, the user can easily know the timing of updating the second X-ray image and/or the need to generate the second X-ray image. Furthermore, the user is allowed to know the timing of updating the second X-ray image such that a decrease in the image quality of the X-ray phase contrast image out of the allowable range can be expected to be reduced or prevented by the user performing update of the second X-ray image. Moreover, the user is allowed to know the need to generate the second X-ray image such that the inability to generate the X-ray phase contrast image can be expected to be prevented by the user performing generation of the second X-ray image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a flowchart for illustrating a process in which a controller according to a modified example notifies a user that a second X-ray image is to be measured.

DETAILED DESCRIPTION

An embodiment of the present invention is hereinafter described with reference to the drawings.

The overall configuration of an X-ray phase imaging apparatus 100 according to the embodiment of the present invention is now described with reference to FIG. 1.

Figure 1:
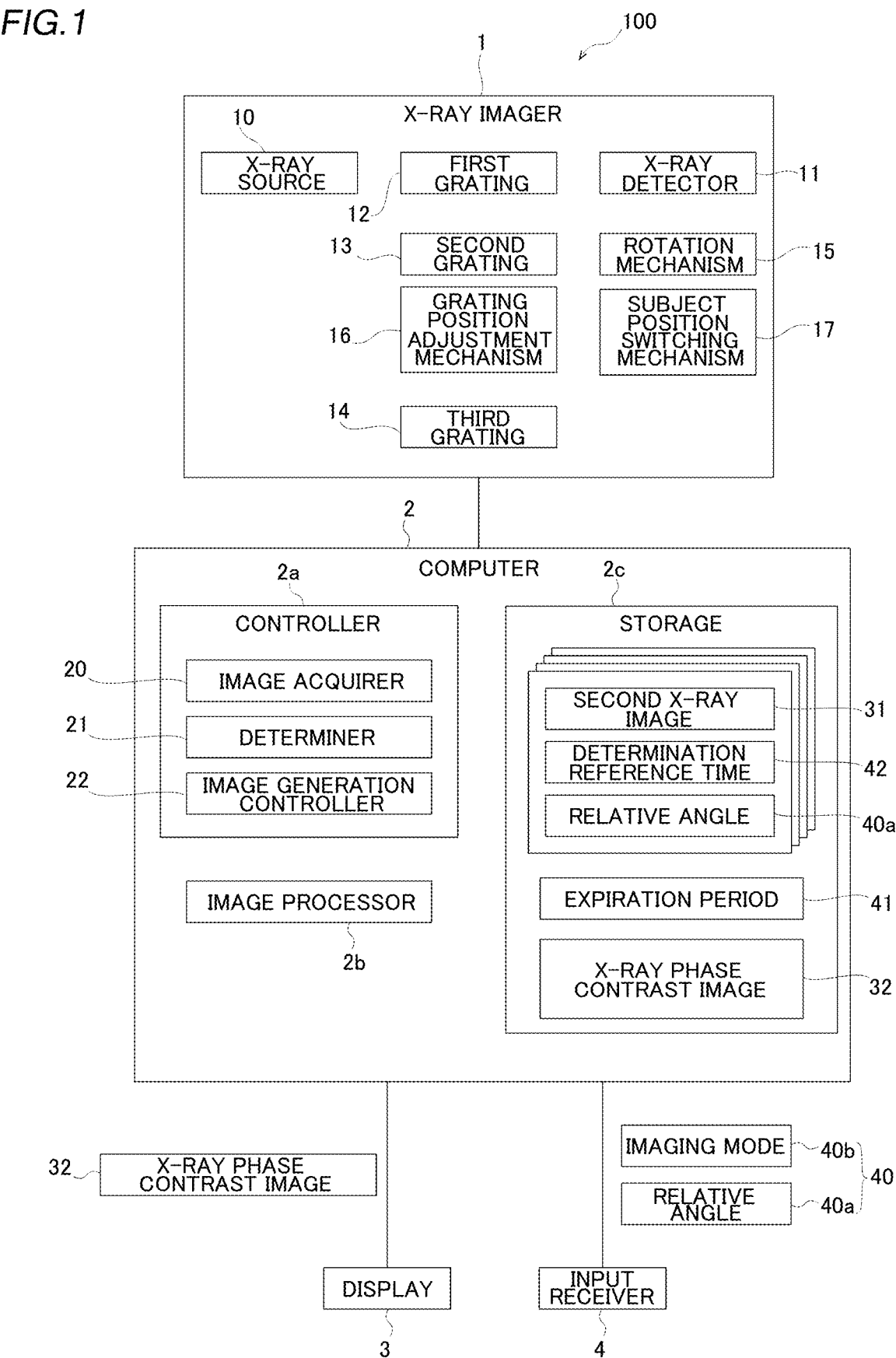
FIG. 1 is a schematic view showing the overall configuration of an X-ray phase imaging apparatus according to an embodiment.

As shown in FIG. 1, the X-ray phase imaging apparatus 100 is an apparatus that images the inside of a subject 90 (see FIG. 2) using the Talbot effect. The X-ray phase imaging apparatus 100 includes an X-ray imager 1 and a computer 2. The X-ray phase imaging apparatus 100 also includes a display 3 and an input receiver 4. The display 3 is an example of a "display device" in the claims.

The X-ray imager 1 includes an X-ray source 10, a plurality of gratings, an X-ray detector 11, rotation mechanisms 15, a grating position adjustment mechanism 16, and a subject position switching mechanism 17. The plurality of gratings include a first grating 12, a second grating 13, and a third grating 14. Details of the X-ray imager 1, such as the arrangement of the X-ray source 10, the plurality of gratings, and the X-ray detector 11, are described below.

The computer 2 includes a controller 2a, an image processor 2b, memories such as a read-only memory (ROM) and a random access memory (RAM), and a storage 2c. The controller 2a includes a central processing unit (CPU), a graphics processing unit (GPU) or a field-programmable gate array (FPGA) configured for image processing, and circuitry, for example. The image processor 2b includes a GPU or an FPGA configured for image processing, and circuitry, for example. The controller 2a is an example of a "control device" in the claims.

The controller 2a controls each portion of the X-ray phase imaging apparatus 100. The controller 2a includes an image acquirer 20, a determiner 21, and an image generation controller 22. The image acquirer 20, the determiner 21, and the image generation controller 22 are configured in software as functional blocks realized by the controller 2a executing various programs. The image acquirer 20, the determiner 21, and the image generation controller 22 may be configured by hardware by providing a dedicated processor (processing circuit).

The image acquirer 20 acquires a first X-ray image 30 (see FIG. 8) obtained by imaging a subject 90 described below and a second X-ray image 31 obtained by imaging without the subject 90 arranged. Specifically, the image acquirer 20 acquires the first X-ray image 30 and the second X-ray image 31 by controlling the X-ray source 10, the grating position adjustment mechanism 16, and the subject position switching mechanism 17. That is, the image acquirer 20 controls imaging of the first X-ray image 30 and the second X-ray image 31. A configuration in which the image acquirer 20 acquires the first X-ray image 30 and the second X-ray image 31 is described below in detail.

The determiner 21 determines whether or not a decrease in the image quality of an X-ray phase contrast image 32 based on the second X-ray image 31 stored in the storage 2c falls within a predetermined allowable range, and/or whether or not the second X-ray image 31 associated with the imaging conditions 40 of the first X-ray image 30 to be acquired has been stored in the storage 2c.

The image generation controller 22 performs a control to generate the X-ray phase contrast image 32 even when a decrease in the image quality of the X-ray phase contrast image 32 does not fall within the allowable range.

The controller 2a makes a notification prompting a user to update or generate the second X-ray image 31 corresponding to the imaging conditions 40 of the first X-ray image 30 to be acquired when it is determined that a decrease in the image quality of the X-ray phase contrast image 32 generated using the second X-ray image 31 associated with the imaging conditions 40 of the first X-ray image 30 to be acquired does not fall within the allowable range and/or when it is determined that the second X-ray image 31 associated with the imaging conditions 40 of the first X-ray image 30 to be acquired has not been stored in the storage 2c. In this embodiment, the controller 2a displays information on the display 3. The display 3 includes a liquid crystal monitor, for example.

The image processor 2b acquires the first X-ray image 30 and the second X-ray image 31 according to the set imaging conditions 40, and generates the X-ray phase contrast image 32 based on the first X-ray image 30 and the second X-ray image 31. In this embodiment, the image processor 2b generates the X-ray phase contrast image 32 based on the first X-ray image 30 and the second X-ray image 31 captured according to the same imaging conditions 40. The imaging conditions 40 include relative angles 40a between the subject 90 and the plurality of gratings. The imaging conditions 40 also include an imaging mode 40b. The imaging conditions 40 include the tube voltage of the X-ray source 10, the tube current of the X-ray source 10, an X-ray exposure time, the number of times the image processor 2b integrates the first X-ray image 30 and the second X-ray image 31 when generating the X-ray phase contrast image 32 (the number of times of integration), etc.

The storage 2c stores the second X-ray image 31. The storage 2c also stores the imaging conditions 40 (the relative angles 40a between the subject 90 and the plurality of gratings, for example), an expiration period 41, determination reference time 42 that is the time at which the second X-ray image 31 has been captured, and the X-ray phase contrast image 32. The storage 2c stores the second X-ray image 31 under each imaging condition 40. Specifically, the storage 2c stores the second X-ray image 31 in association with the determination reference time 42.

The storage 2c stores the second X-ray image 31 at each of a plurality of relative angles 40a. The storage 2c stores the second X-ray image 31 and the determination reference time 42 in association with each relative angle 40a. The storage 2c includes a non-volatile storage device such as a hard disk drive (HDD) or a solid state drive (SSD).

The input receiver 4 receives a user's operation input. The input receiver 4 receives an input of a selection operation of the imaging conditions 40 by the user, for example. The input receiver 4 includes input devices such as a keyboard and a mouse, for example.

Figure 2:
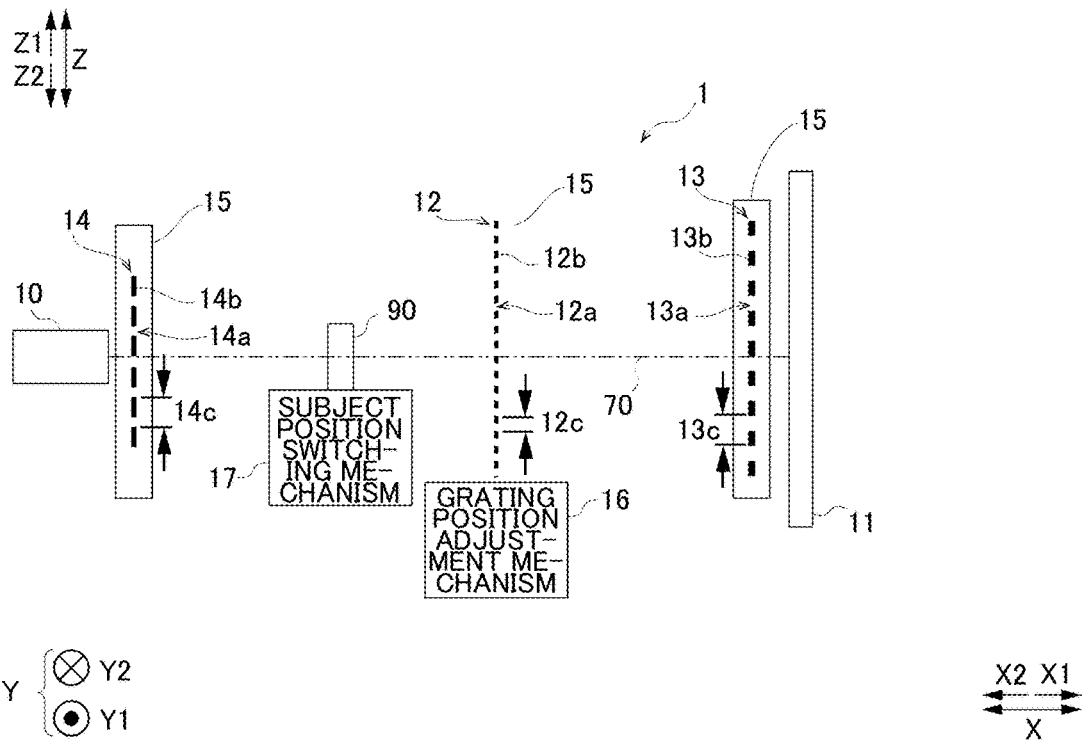
FIG. 2 is a schematic view for illustrating the configuration of an X-ray imager of the X-ray phase imaging apparatus according to the embodiment.

As shown in FIG. 2, the X-ray source 10, a third grating 14, a first grating 12, a second grating 13, and the X-ray detector 11 are aligned in this order in an X-ray irradiation axis 70 direction. That is, the third grating 14, the first grating 12, and the second grating 13 are arranged between the X-ray source 10 and the X-ray detector 11. In this specification, an upward-downward direction is defined as a Z direction, an upward direction is defined as a Z1 direction, and a downward direction is defined as a Z2 direction. Furthermore, a direction passing through the X-ray source 10 and the X-ray detector 11 is defined as an X direction, one side in the X direction is defined as an X1 direction side, and the other side in the X direction is defined as an X2 direction side. A direction perpendicular to the Z direction and the X direction is defined as a Y direction, one side in the Y direction is defined as a Y1 direction side, and the other side in the Y direction is defined as a Y2 direction side.

The X-ray source 10 irradiate the subject 90 with X-rays. Specifically, the X-ray source 10 generates X-rays when a high voltage is applied thereto.

The X-ray detector 11 detects X-rays emitted from the X-ray source 10. The X-ray detector 11 converts the detected X-rays into electrical signals. The X-ray detector 11 is a flat panel detector (FPD), for example. The X-ray detector 11 includes a plurality of conversion elements (not shown) and pixel electrodes (not shown) arranged on the plurality of conversion elements. The plurality of conversion elements and the pixel electrodes are aligned in the Y direction and the Z direction at a predetermined period (pixel pitch). A detection signal (image signal) from the X-ray detector 11 is transmitted to the image processor 2b (see FIG. 1).

The first grating 12 is arranged between the X-ray source 10 and the X-ray detector 11 and is irradiated with X-rays from the X-ray source 10. The first grating 12 includes slits 12a and X-ray phase changers 12b arranged at a predetermined period (grating pitch) 12c in the Z direction. Each slit 12a and each X-ray phase changer 12b extend linearly in the Y direction. The first grating 12 is a so-called phase grating. The first grating 12 is arranged between the X-ray source 10 and the second grating 13 and is provided to form a self-image (by the Talbot effect) with X-rays emitted from the X-ray source 10. The Talbot effect indicates that when X-rays with coherence pass through a grating in which slits are formed, an image (self-image) of the grating is formed at a position away from the grating by a predetermined distance (Talbot distance).

The second grating 13 is irradiated with X-rays from the first grating 12. The second grating 13 includes a plurality of X-ray transmissive portions 13a and a plurality of X-ray absorbers 13b arranged at a predetermined period (grating pitch) 13c in the Z direction. Each X-ray transmissive portion 13a and each X-ray absorber 13b extend linearly in the Y direction. The second grating 13 is a so-called absorption grating. The second grating 13 is arranged between the first grating 12 and the X-ray detector 11 and interferes with the self-image formed by the first grating 12. The second grating 13 is arranged at a position away from the first grating 2 by the Talbot distance in order to cause the self-image to interfere with the second grating 13.

The third grating 14 is arranged between the X-ray source 10 and the first grating 12. The third grating 14 includes a plurality of slits 14a and a plurality of X-ray absorbers 14b arranged at a predetermined period (pitch) 14c in the Z direction. Each slit 14a and each X-ray absorber 14b extend linearly in the Y direction. Moreover, each slit 14a and each X-ray absorber 14b extend in parallel. The third grating 14 is arranged between the X-ray source 10 and the first grating 12 and is irradiated with X-rays from the X-ray source 10. The third grating 14 allows X-rays that have passed through the respective slits 14a to function as linear light sources corresponding to the positions of the respective slits 14a.

In this embodiment, each of the first grating 12, the second grating 13, and the third grating 14 is arranged such that the grating pattern extends in the Y direction. The grating pattern includes the slits 12a, the X-ray phase changers 12b, the X-ray transmissive portions 13a, the X-ray absorbers 13b, the slits 14a, the X-ray absorbers 14b, etc.

The rotation mechanisms 15 relatively rotate the subject 90 and the plurality of gratings in a rotation direction about the X-ray irradiation axis 70. Specifically, a rotation mechanism 15 is provided for each of the plurality of gratings, and rotates each of the plurality of gratings in the rotation direction about the X-ray irradiation axis 70 to relatively rotate the subject 90 and the plurality of gratings in the rotation direction about the X-ray irradiation axis 70.

The grating position adjustment mechanism 16 can move the first grating 12 in the X direction, the Y direction, the Z direction, a rotation direction Rz about a Z direction axis, a rotation direction Rx about an X direction axis, and a rotation direction Ry about a Y direction axis.

Rotation Mechanism

Figure 3:
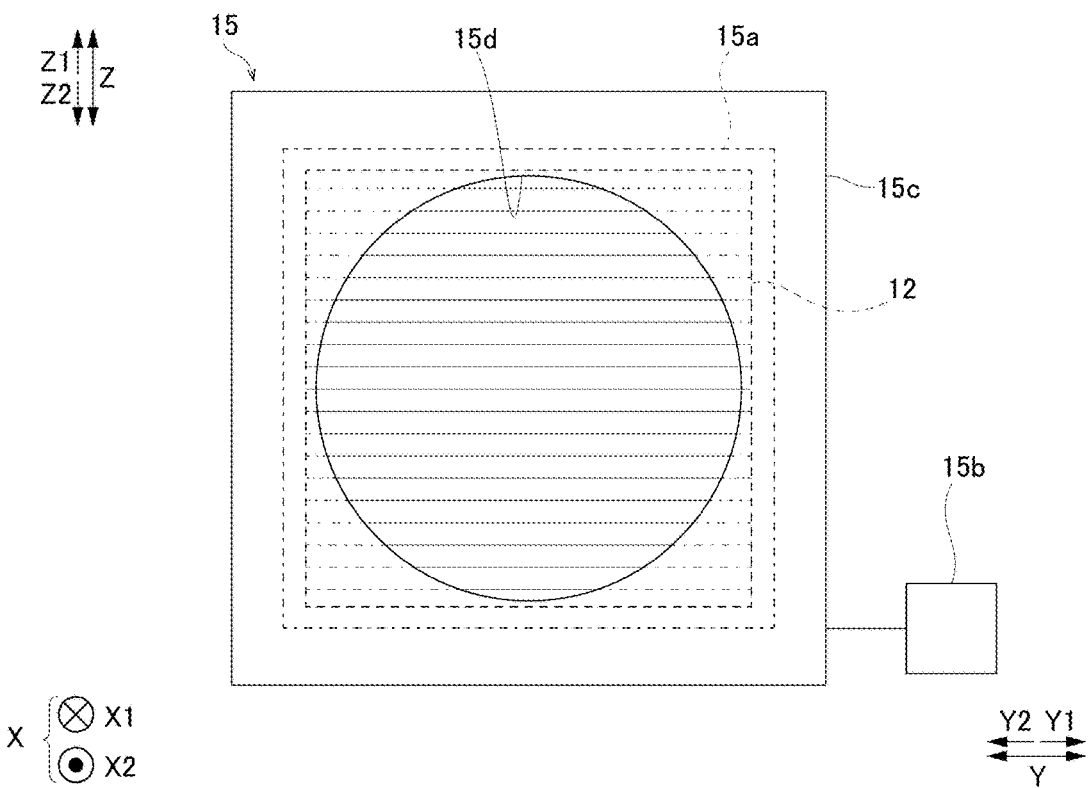
FIG. 3 is a schematic view for illustrating the configuration of a rotation mechanism of the X-ray phase imaging apparatus according to the embodiment.

The configuration of the rotation mechanism 15 according to this embodiment is now described with reference to FIG. 3. The rotation mechanism 15 is provided for each of the plurality of gratings, but all the rotation mechanisms 15 have the same configuration except for the gratings to be rotated. Therefore, in FIG. 3, the rotation mechanism 15 that rotates the first grating 12 is illustrated as a representative.

The rotation mechanism 15 includes a grating holder 15a, a drive 15b that rotates the grating holder 15a in the rotation direction about the X-ray irradiation axis 70, and a storage 15c that stores the grating holder 15a such that the grating holder 15a is rotatable. An opening 15d is provided in the storage 15c. A position facing the opening 15d (a position indicated by a solid line in the first grating 12 shown in FIG. 3) in the first grating 12 held by the grating holder 15a is irradiated with X-rays from the X-ray source 10. The drive 15b rotates the first grating 12 in the rotation direction about the X-ray irradiation axis 70 by rotating the grating holder 15a in the rotation direction about the X-ray irradiation axis 70. The drive 15b includes a stepping motor, a pulley, and a belt member, for example.

The image acquirer 20 controls the rotation mechanisms 15 to rotate the plurality of gratings such that the relative angles 40a correspond to the imaging conditions 40 (FIG. 1). The relative angles 40a refer to the angles of the plurality of grating with respect to the subject 90. For example, when a state in which the grating pattern is directed in the Z1 direction is taken as a reference angle (0 degree), the angles of the gratings in the rotation direction about the X-ray irradiation axis 70 are the relative angles 40a of the plurality of gratings with respect to the subject 90. The image acquirer 20 controls the rotation mechanism 15 provided for each of the plurality of gratings to rotate the plurality of gratings such that the relative angles 40a of the plurality of gratings are the same as each other. For example, when the relative angles 40a are 45 degrees, each of the plurality of gratings is rotated by the rotating mechanism 15 by 45 degrees.

Grating Position Adjustment Mechanism

Figure 4:
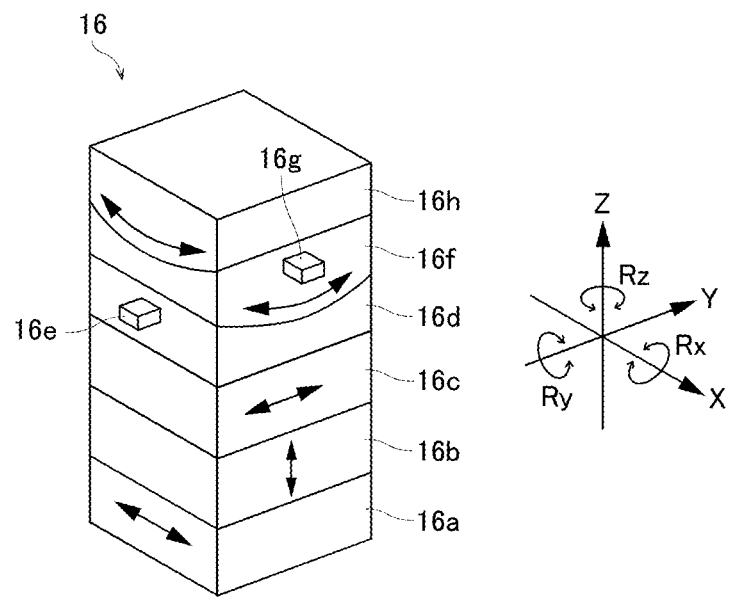
FIG. 4 is a schematic view for illustrating the configuration of a grating position adjustment mechanism of the X-ray phase imaging apparatus according to the embodiment.

As shown in FIG. 4, the grating position adjustment mechanism 16 includes an X-direction linear motion mechanism 16a, a Z-direction linear motion mechanism 16b, a Y-direction linear motion mechanism 16c, a linear motion mechanism connector 16d, a stage support drive 16e, a stage support 16f, a stage drive 16g, and a stage 16h.

The X-direction linear motion mechanism 16a, the Z-direction linear motion mechanism 16b, and the Y-direction linear motion mechanism 16c are movable in the X, Z, and Y directions, respectively. The X-direction linear motion mechanism 16a, the Z-direction linear motion mechanism 16b, and the Y-direction linear motion mechanism 16c include stepping motors, for example. The grating position adjustment mechanism 16 moves the first grating 12 (see FIG. 1) in the X, Z, and Y directions by the operations of the X-direction linear motion mechanism 16a, the Z-direction linear motion mechanism 16b, and the Y-direction linear motion mechanism 16c, respectively.

The stage support 16f supports the stage 16h on which the first grating 12 is arranged from below (Z2 direction) in FIG. 4. The stage drive 16g reciprocates the stage 16h in the X direction. The stage 16h has a bottom formed in a convex curved shape toward the stage support 16f, and is reciprocated in the X direction to rotate about the Y direction axis (in the direction Ry). The stage support drive 16e reciprocates the stage support 16f in the Y direction. The stage support 16f has a bottom formed in a convex curved shape toward the linear motion mechanism connector 16d, and is reciprocated in the Y direction to rotate about the X-direction axis (in the direction Rx). The linear motion mechanism connector 16d is provided on the Y direction linear motion mechanism 16c so as to be rotatable about the Z direction axis (in the direction Rz). With the configuration described above, in the grating position adjustment mechanism 16, fringe scanning can be performed on the first grating 12 in the Z direction by the operation of the Z-direction linear motion mechanism 16b.

Subject Position Switching Mechanism

Figure 5:
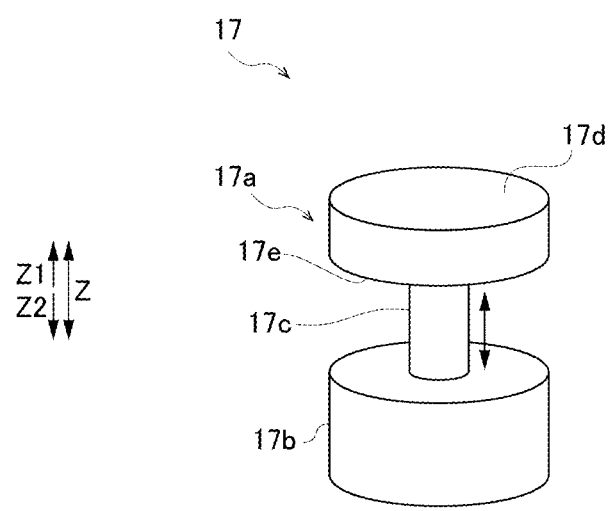
FIG. 5 is a schematic view for illustrating the configuration of a subject position switching mechanism of the X-ray phase imaging apparatus according to the embodiment.

The configuration of the subject position switching mechanism 17 is now described with reference to FIG. 5. As shown in FIG. 5, the subject position switching mechanism 17 includes a subject holder 17a, a drive 17b, and an expansible/contractible portion 17c.

The subject holder 17a has a cylindrical shape in a plan view. A holding surface 17d for holding the subject 90 is provided on a first-side (Z1 direction side) end face of the subject holder 17a in the Z direction. A connection surface 17e connected to the expansible/contractible portion 17c is provided on a second-side (Z2 direction side) end face of the subject holder 17a in the Z direction.

As shown in FIG. 5, the drive 17b is connected to the subject holder 17a via the expansible/contractible portion 17c. The drive 17b holds the expansible/contractible portion 17c from the Z2 direction side. The drive 17b expands and contracts the expansible/contractible portion 17c in the Z direction.

An end face of the expansible/contractible portion 17c on the second side (Z2 direction side) in the Z direction is connected to the drive 17b, and an end face of the expansible/contractible portion 17c on the first side (Z1 direction side) in the Z direction is connected to the connection surface 17e of the subject holder 17a. The expansible/contractible portion 17c is expansible and contractible in the Z direction by the drive 17b. That is, the subject position switching mechanism 17 according to this embodiment moves the subject holder 17a in the upward-downward direction (Z direction) by expanding and contracting the expansible/contractible portion 17c to switch the position of the subject 90 between an imaging position 72 and a retracted position 73, which are described below.

Imaging Position and Retracted Position

The imaging position 72 and the retracted position 73 are now described with reference to FIGS. 6 and 7.

Figure 6:
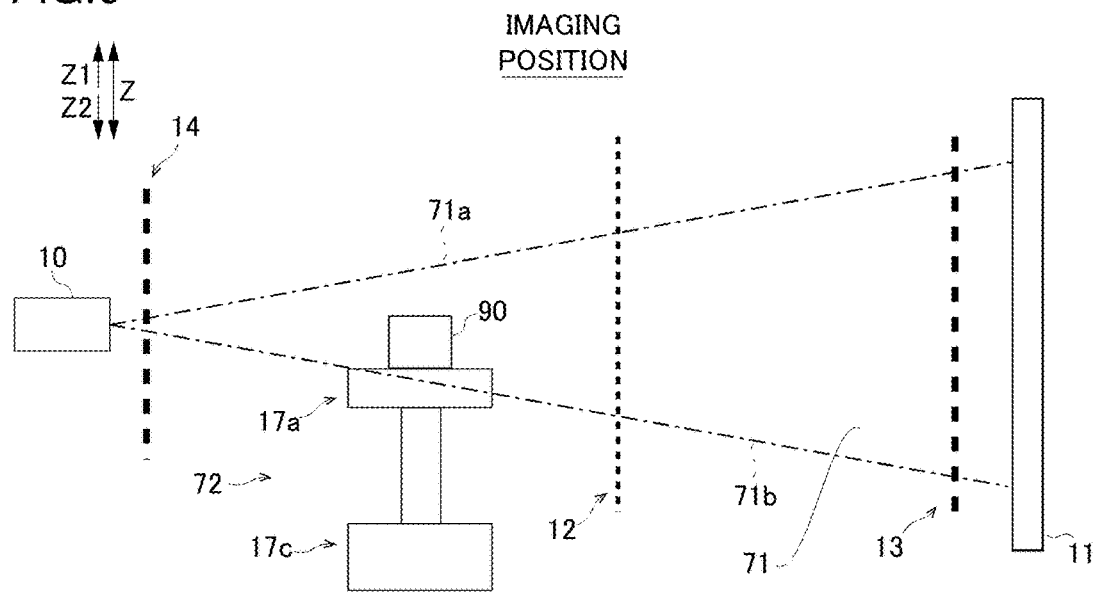
FIG. 6 is a diagram for illustrating a configuration in which a subject is arranged at an imaging position, which is a position within an imaging area of an X-ray detector.

As shown in FIG. 6, the imaging position 72 is a position at which the subject 90 is within the imaging field of view area 71 of the X-ray detector 11. The imaging field of view area 71 is an area determined by the X-ray source 10, the X-ray detector 11, and the X-rays emitted from the X-ray source 10. In an example shown in FIG. 6, the X-rays are emitted to a range indicated by a dashed-dotted line 71a and a dashed-dotted line 71b. Therefore, an area determined by the X-ray source 10, the X-ray detector 11, and the dashed-dotted lines 71a and 71b is the imaging field of view area 71. In this embodiment, the subject position switching mechanism 17 moves the subject 90 to the imaging position 72 by moving the subject 90 in the Z1 direction while the subject 90 is located at the retracted position 73.

The image acquirer 20 acquires the first X-ray image 30 obtained by imaging the subject 90 arranged at the imaging position 72 within the imaging field of view area 71 of the X-ray detector 11 according to the preset imaging conditions 40. That is, the first X-ray image 30 is an image in which the subject 90 appears.

Figure 7:
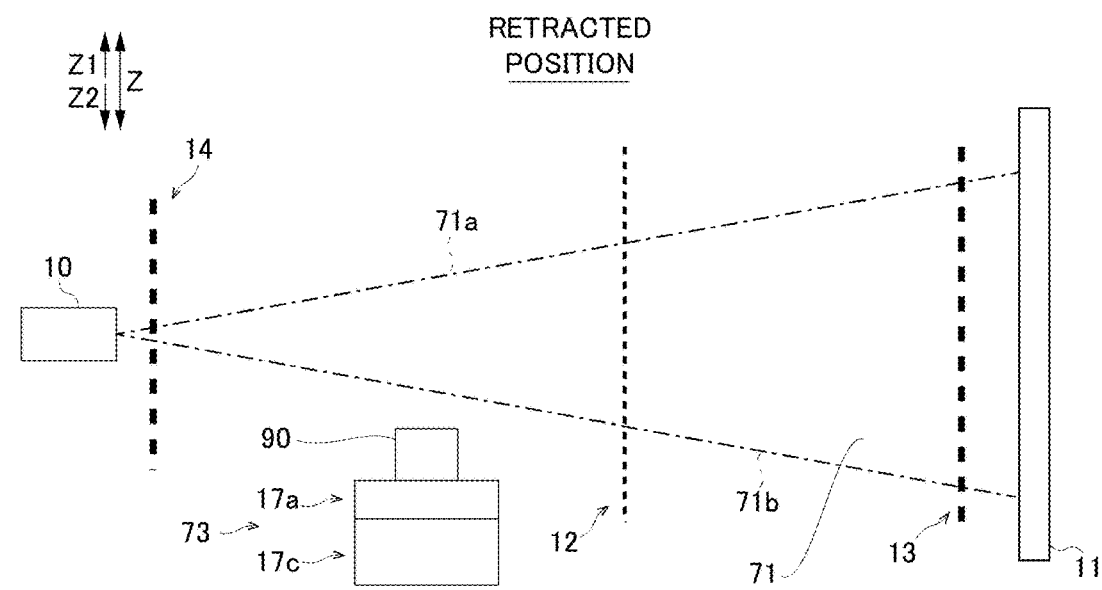
FIG. 7 is a diagram for illustrating a configuration in which the subject is arranged at a retracted position, which is a position outside the imaging area of the X-ray detector.

As shown in FIG. 7, the retracted position 73 is a position at which the subject 90 is outside the imaging field of view area 71 of the X-ray detector 11. The subject position switching mechanism 17 moves the subject 90 to the retracted position 73 by moving the subject 90 in the Z2 direction while the subject 90 is located at the imaging position 72.

In this embodiment, the subject position switching mechanism 17 switches the position of the subject 90 between the imaging position 72 and the retracted position 73 by moving the subject 90 in the Z direction. That is, the retracted position 73 and the imaging position 72 are the same in the X and Y directions and different in the Z direction.

The image acquirer 20 places the subject 90 at the retracted position 73 outside the imaging field of view area 71 of the X-ray detector 11 according to the imaging conditions 40, and acquires the second X-ray image obtained by imaging without the subject 90 arranged within the imaging field of view area 71. That is, the second X-ray image 31 is an image in which the subject 90 does not appear.

Configuration in which X-Ray Phase Contrast Image is Generated

A configuration in which the image processor 2b generates the X-ray phase contrast image 32 is now described with reference to FIGS. 8 and 9.

Figure 8:
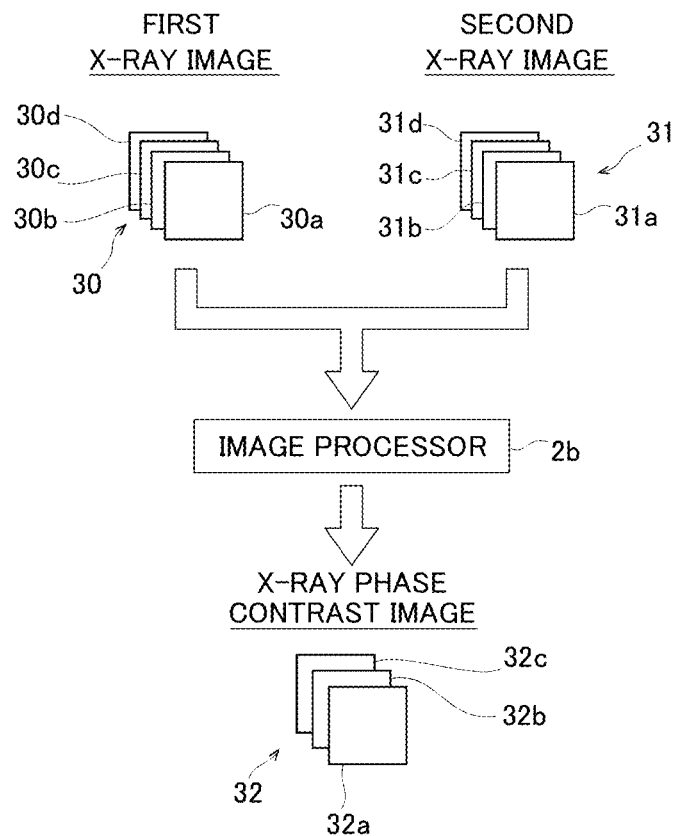
FIG. 8 is a schematic view for illustrating a configuration in which an image processor according to the embodiment generates an X-ray phase contrast image from a first X-ray image and a second X-ray image.

As shown in FIG. 8, under the control of the image acquirer 20, the first X-ray image 30 and the second X-ray image 31 are captured. The first X-ray image 30 is an image captured at the imaging position 72. The second X-ray image 31 is an image captured at the retracted position 73.

In this embodiment, the image processor 2b generates the X-ray phase contrast image 32 by a so-called fringe scanning method in which an image is captured while the first grating 12 is translated by the grating position adjustment mechanism 16. Therefore, the first X-ray image 30 and the second X-ray image 31 are acquired as many times as the first grating 12 is translated. The number of times the first grating 12 is translated is four times, for example. Thus, in an example shown in FIG. 8, four first X-ray images 30a, 30b, 30c, and 30d corresponding to translational positions, respectively, are captured as first X-ray images 30. Furthermore, four second X-ray images 31a, 31b, 31c, and 31d corresponding to the translational positions, respectively, are captured as second X-ray images 31.

The image processor 2b generates X-ray phase contrast images 32 based on a plurality of first X-ray images 30 and a plurality of second X-ray images 31 captured by translating the first grating 12. In this embodiment, the image processor 2b generates an absorption image 32a, a phase differential image 32b, and a dark field image 32c as the X-ray phase contrast images 32.

Figure 9:
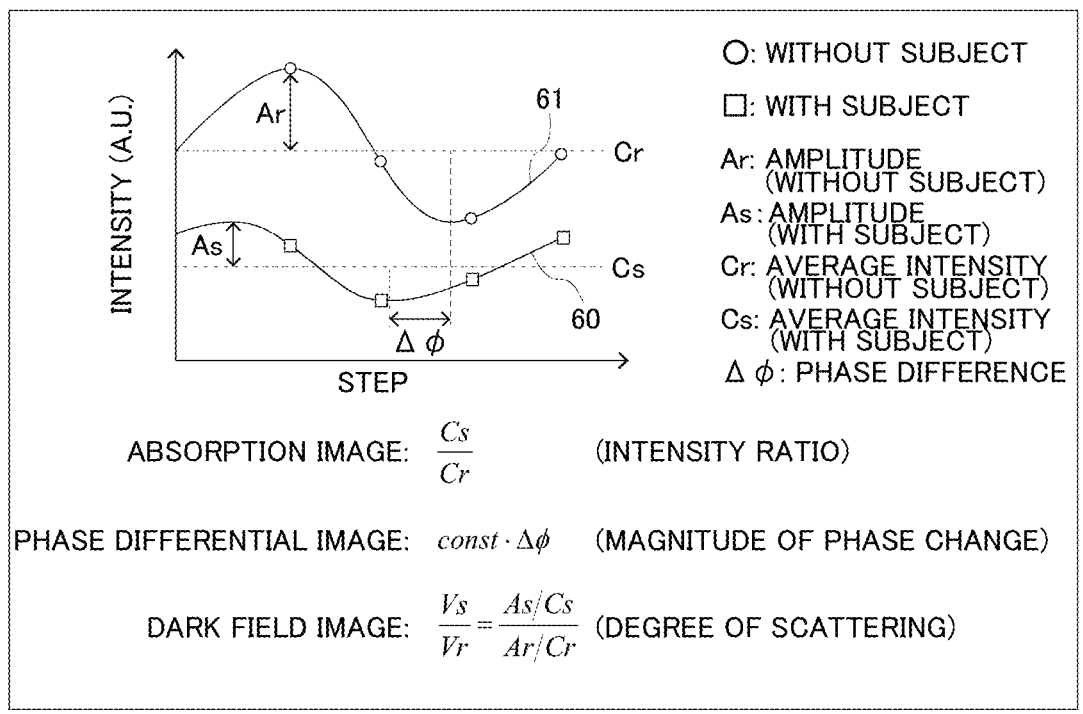
FIG. 9 is a schematic view for illustrating a detailed configuration in which the image processor according to the embodiment generates the X-ray phase contrast image.

As shown in FIG. 9, the image processor 2b uses an intensity signal curve 60 and an intensity signal curve 61 acquired based on the X-ray intensity distribution detected by the X-ray detector 11 to generate the X-ray phase contrast image 32. The intensity signal curve 60 is a curve showing the X-ray intensity distribution obtained by imaging with the subject 90 arranged. The intensity signal curve 61 is a curve showing the X-ray intensity distribution obtained by imaging without the subject 90 arranged. That is, the intensity signal curve 60 is acquired based on the plurality of first X-ray images 30. The intensity signal curve 61 is acquired based on the plurality of second X-ray images 31. The intensity signal curve 60 is acquired at every pixel of the first X-ray image 30. The intensity signal curve 61 is acquired at every pixel of the second X-ray image 31.

As shown in FIG. 9, the absorption image 32a can be generated based on a ratio of the average X-ray intensity Cs in a case in which an image is captured with the subject 90 arranged and the average X-ray intensity Cr in a case in which an image is captured without the subject 90 arranged. The phase differential image 32b can be generated by multiplying a phase difference $\Delta\varphi$ between the intensity signal curve 60 acquired by imaging with the subject 90 arranged and the intensity signal curve 61 acquired by imaging without the subject 90 arranged by a number determined by a predetermined calculation. The dark field image 32c can be generated by a ratio of the visibility (Vr) of the X-ray image captured without the subject 90 arranged and the visibility (Vs) of the X-ray image captured with the subject 90 arranged. Vr can be determined by a ratio of the amplitude Ar and the average intensity Cr of the intensity signal curve 61. Vs can be determined by a ratio of the amplitude As and the average intensity Cs of the intensity signal curve 60.

Absorption Image, Phase Differential Image, and Dark Field Image

Figure 10:
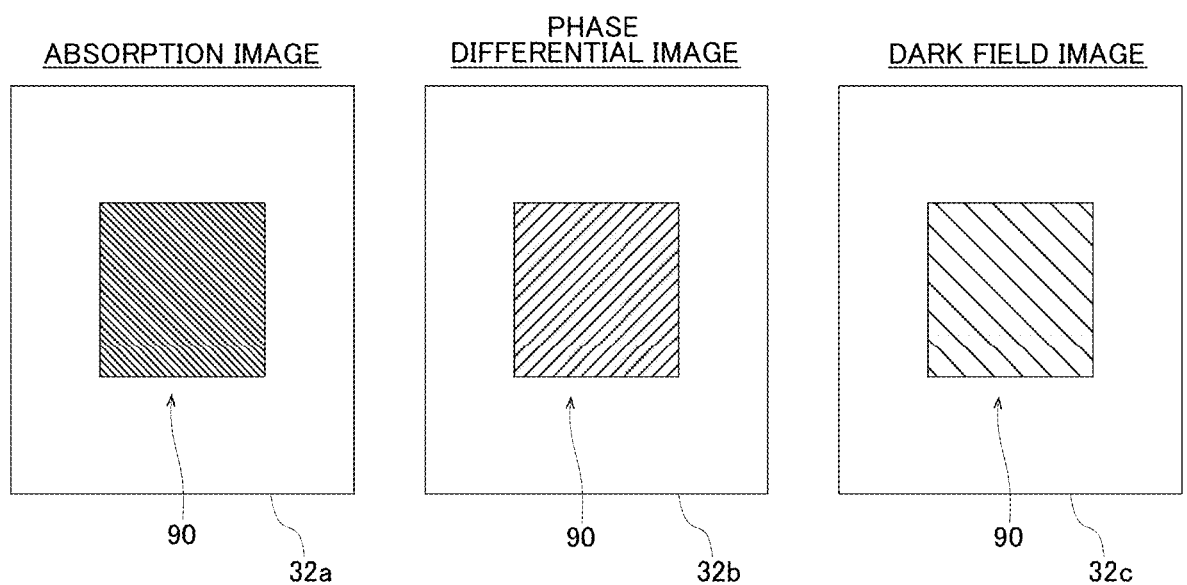
FIG. 10 is a schematic view for illustrating an absorption image, a phase differential image, and a dark field image generated by the X-ray phase imaging apparatus according to the embodiment.

As shown in FIG. 10, the image processor 2b generates the absorption image 32a, the phase differential image 32b, and the dark field image 32c.

Imaging Condition Setting Screen

Figure 11:
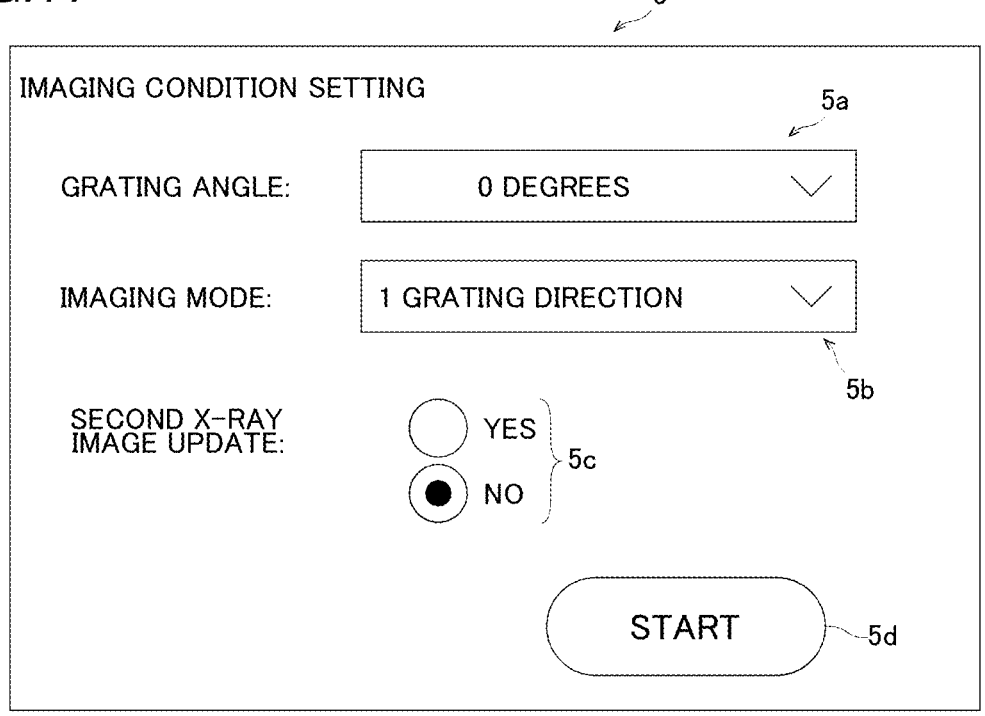
FIG. 11 is a schematic view for illustrating a screen for setting imaging conditions.

An imaging condition setting screen 5 shown in FIG. 11 is a screen displayed on the display 3 (see FIG. 1) when the user sets the imaging conditions 40. The imaging condition setting screen 5 includes a grating angle selection field 5a, an imaging mode selection field 5b, a second X-ray image update mode selection field 5c, and a start button 5d. Although not shown in FIG. 11, the user sets the dose of X-rays emitted from the X-ray source 10, the X-ray exposure time, the number of times the image processor 2b integrates the first X-ray image 30 and the second X-ray image 31 when generating the X-ray phase contrast image 32 (the number of times of integration), etc. In the grating angle selection field 5a, options for the angles of the plurality of gratings at which the subject 90 is imaged are displayed. The options for the angles of the plurality of gratings displayed in the grating angle selection field 5a include 0 degrees, 45 degrees, and 90 degrees, for example. The user can select a plurality of grating relative angles 40a with respect to the subject 90 by using the grating angle selection field 5a. The grating angle selection field 5a is a pull-down selection field, for example.

A selection field for the imaging mode 40b is displayed in the imaging mode selection field 5b. Specifically, in the imaging mode selection field 5b, options for the directions of a plurality of gratings with respect to the subject 90 for imaging the subject 90 are displayed as the imaging mode 40b. The options for the directions of the gratings displayed in the imaging mode selection field 5b include one direction, two directions, and four directions, for example. The user can select the directions of the gratings with respect to the subject 90 by selecting the directions of the gratings in the imaging mode selection field 5b. The imaging mode selection field 5b is a pull-down selection field, for example.

The directions of the gratings indicate the number of relative angles 40a included in the imaging conditions 40. When the option "one direction" is selected, imaging is performed at one relative angle 40a. Specifically, imaging is performed only at the relative angle 40a selected by using the grating angle selection field 5a.

When the option "two directions" is selected, imaging is performed at two relative angles 40a. Specifically, after imaging is performed at the relative angle 40a selected by using the grating angle selection field 5a, the plurality of gratings are rotated by a preset angle (90 degrees, for example), and imaging is performed. That is, when the option "two directions" is selected, imaging is performed at two relative angles 40a including the selected relative angle 40a and an angle obtained by rotating the selected relative angle 40a by 90 degrees.

When the option "four directions" is selected, imaging is performed at four relative angles 40a. Specifically, after imaging is performed at the relative angle 40a selected by using the grating angle selection field 5a, imaging is performed while the plurality of gratings are rotated by a preset angle (45 degrees, for example). That is, when the option "four directions" is selected, imaging is performed at four relative angles 40a including the selected relative angle 40a, an angle obtained by rotating the selected relative angle 40a by 45 degrees, an angle obtained by rotating the selected relative angle 40a by 90 degrees, and an angle obtained by rotating the selected relative angle 40a by 135 degrees.

An option as to whether or not the second X-ray image 31 is captured is displayed in the second X-ray image update mode selection field 5c. In an example shown in FIG. 11, "YES" and "NO" are displayed as options in the second X-ray image update mode selection field 5c.

The start button 5d is a graphical user interface (GUI) push button. When the start button 5d is pressed, acquisition of the first X-ray image 30 by the image acquirer 20 and generation of the X-ray phase contrast image 32 by the image processor 2b are started.

When the user selects "YES" and presses the start button 5d, the second X-ray image 31 is captured before the first X-ray image 30 is captured. When the user selects "NO", the first X-ray image 30 is captured without capturing the second X-ray image 31, and the X-ray phase contrast image 32 is generated using the second X-ray image 31 stored in the storage 2c (see FIG. 1). When "YES" is selected in the second X-ray image update mode selection field 5c, the second X-ray image 31 is captured before the first X-ray image 30 is captured. That is, the image acquirer 20 (see FIG. 1) moves the subject 90 to the retracted position 73 by controlling the subject position switching mechanism 17. Furthermore, the image acquirer 20 rotates the plurality of gratings by controlling the rotation mechanisms 15 such that the relative angle 40a becomes a predetermined angle. Then, the image acquirer 20 captures the second X-ray image 31. After capturing the second X-ray image 31, the image acquirer 20 moves the subject 90 to the imaging position 72 by controlling the subject position switching mechanism 17. Then, the image acquirer 20 captures the first X-ray image 30. After that, the image processor 2b generates the X-ray phase contrast image 32 based on the captured first X-ray image 30 and second X-ray image 31. After generating the X-ray phase contrast image 32, the controller 2a stores the captured second X-ray image 31 in the storage 2c.

The angles of the gratings selected by using the grating angle selection field 5a are initial angles of the plurality of gratings with respect to the subject 90 for imaging in the selected imaging mode 40b (see FIG. 1). That is, when the start button 5d is pressed, the image acquirer 20 controls the rotation mechanisms 15 to rotate the plurality of gratings such that the relative angle 40a selected by the grating angle selection field 5a is reached. When the direction selected by using the imaging mode selection field 5b is one direction, imaging is performed only at the initial angles.

When the user selects a mode for imaging with the gratings directed in a plurality of directions as the imaging mode 40b, the image acquirer 20 controls the rotation mechanisms 15 to rotate the plurality of gratings such that a plurality of relative angles 40a corresponding to the option are reached.

The image acquirer 20 relatively rotates the subject 90 and the plurality of gratings by the rotation mechanisms 15, and acquires the first X-ray images 30 and the second X-ray images 31 captured at the plurality of relative angles 40a.

The image processor 2b generates the X-ray phase contrast image 32 at each of the plurality of relative angles 40a based on the first X-ray image 30 and the second X-ray image 31 at each of the plurality of relative angles 40a. For example, when the user selects a mode for imaging in two directions, the image processor 2b generates two X-ray phase contrast images 32 based on first X-ray images 30 and second X-ray images 31 at respective relative angles 40a corresponding to the respective directions, which are captured by rotating the plurality of gratings in the two directions.

Determination Process of Second X-Ray Image

When the imaging conditions 40 under which the second X-ray image 31 is captured and the imaging conditions 40 under which the first X-ray image 30 is captured are different from each other, the X-ray phase contrast image 32 may not be generated. Moreover, even when the imaging conditions 40 are the same, the image quality of the generated X-ray phase contrast image 32 may be decreased. For example, due to heat emitted from the X-ray source 10, a temperature change at a location at which the X-ray phase imaging apparatus 100 is installed, vibrations during translational movement by the grating position adjustment mechanism 16, etc., the relative positions of the plurality of gratings may be shifted. The X-ray detector 11 gradually deteriorates each time it is exposed to X-rays. Therefore, as time passes after the second X-ray image 31 stored in the storage 2c is captured, differences occur between the states of the plurality of gratings and the state of the X-ray detector 11 when the second X-ray image 31 is captured and the states of the plurality of gratings and the state of the X-ray detector 11 when the first X-ray image 30 is captured. In this case, a change occurs between the first X-ray image 30 and the second X-ray image 31 due to a factor other than the subject 90, and thus the image quality of the X-ray phase contrast image 32 generated based on the first X-ray image 30 and the second X-ray image 31 stored in the storage 2c is decreased.

Therefore, in this embodiment, the determiner 21 determines whether or not the imaging conditions 40 at the time of capturing the second X-ray image 31 stored in the storage 2c match the imaging conditions 40 at the time of capturing the first X-ray image 30. Furthermore, in this embodiment, the determiner 21 determines whether or not a decrease in the image quality of the X-ray phase contrast image 32 based on the second X-ray image 31 stored in the storage 2c falls within the predetermined allowable range. Specifically, the determiner 21 determines whether or not the second X-ray image 31 has exceeded the preset expiration period 41 as an indicator of whether or not the decrease in the image quality of the X-ray phase contrast image 32 falls within the allowable range.

More specifically, the determiner 21 determines whether or not an elapsed time from the determination reference time 42 or a length of time determined based on the cumulative number of times of imaging after the second X-ray image 31 is stored in the storage 2c has exceeded the expiration period 41. The expiration period 41 is 24 hours, for example. The expiration period 41 may be a length of time other than 24 hours. The expiration period 41 can be set to any value depending on the installation environment of the X-ray phase imaging apparatus 100 or an imaging frequency, for example.

When the user selects the imaging mode 40b for imaging with the gratings arranged in a plurality of directions, the determiner 21 determines whether or not a decrease in the image quality of each of the X-ray phase contrast images 32 at the plurality of respective relative angles 40a using the second X-ray images 31 corresponding to the plurality of relative angles 40a of the first X-ray images 30 to be acquired falls within the allowable range.

When a decrease in the image quality of the X-ray phase contrast image 32 does not fall within the allowable range, the user conceivably updates the second X-ray image 31 in order to reduce or prevent the decrease in the image quality of the X-ray phase contrast image 32. At this time, in a case of a configuration in which the user is notified that the decrease in the image quality of the X-ray phase contrast image 32 does not fall within the allowable range after the user presses the start button 5d, for example, after pressing the start button 5d, the user selects "YES" in the second X-ray image update mode selection field 5c, and presses the start button 5d again to update the second X-ray image 31.

Therefore, in order to improve user convenience (usability), in this embodiment, the determiner 21 determines whether or not a decrease in the image quality of the X-ray phase contrast image 32 falls within the allowable range at each preset time interval. That is, the determiner 21 determines whether or not a decrease in the image quality of the X-ray phase contrast image 32 falls within the allowable range each time the set time elapses, regardless of a user's operation. The time interval at which the determiner 21 determines whether or not a decrease in the image quality of the X-ray phase contrast image 32 falls within the allowable range is a time interval shorter than the expiration period 41.

Notification Prompting Update of Second X-Ray Image

Figure 12:
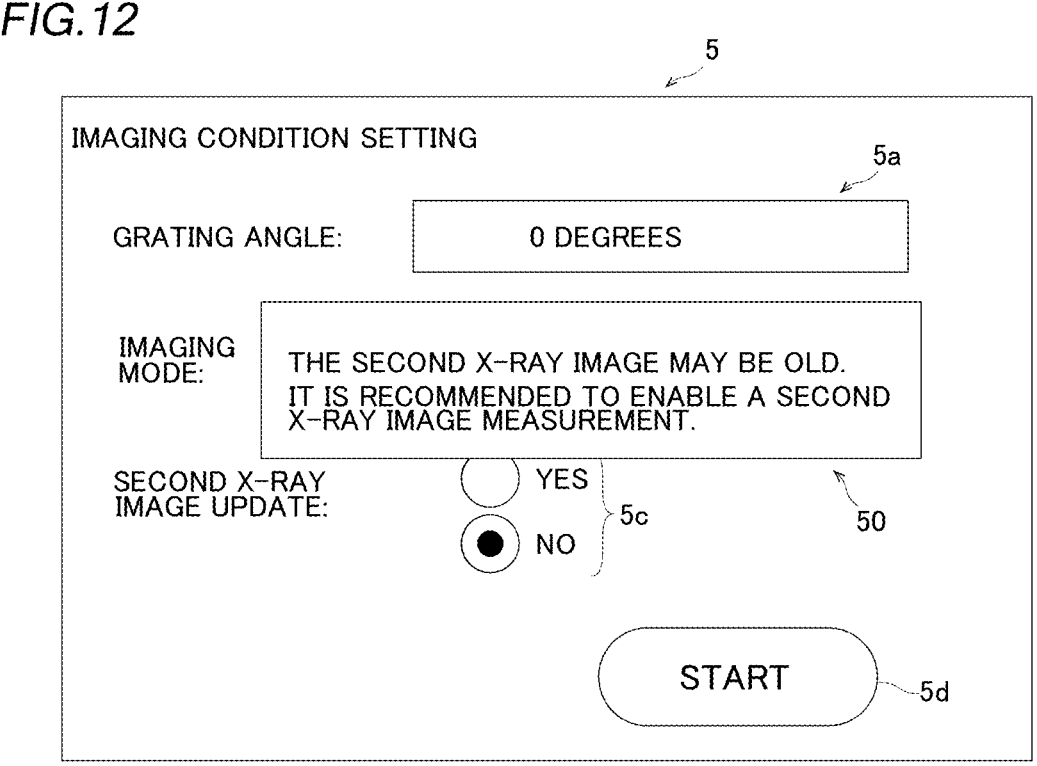
FIG. 12 is a schematic view for illustrating a screen example in which information prompting update of the second X-ray image is displayed.

An example shown in FIG. 12 is a screen example when the display 3 displays the information 50 prompting update of the second X-ray image 31. Specifically, under the control of the controller 2a, the display 3 displays the information 50 prompting update of the second X-ray image 31 when the second X-ray image 31 has exceeded the preset expiration period 41. That is, the controller 2a causes the display 3 to display the information 50 prompting update of the second X-ray image 31 when the second X-ray image 31 has exceeded the preset expiration period 41. In this embodiment, the display 3 displays the information 50 prompting update of the second X-ray image 31 in a pop-up format. The information 50 prompting update of the second X-ray image 31 is hidden when the pop-up window is closed by a user's operation or the user presses the start button 5d, for example.

In this embodiment, when the second X-ray image 31 has exceeded the expiration period 41, the display 3 displays the information 50 prompting update of the second X-ray image 31 before the X-ray phase contrast image 32 is generated by the image processor 2b.

The image generation controller 22 performs a control to generate the X-ray phase contrast image 32 based on a user's operation even when it is determined that a decreases in the image quality of the X-ray phase contrast image 32 generated using the second X-ray image 31 in association with the imaging conditions 40 of the first X-ray image 30 to be acquired does not fall within the allowable range. That is, the image generation controller 22 performs a control to enable the start button 5d to be pressed even when the second X-ray image 31 has exceeded the expiration period 41. When the start button 5d is pressed while the second X-ray image 31 has exceeded the expiration period 41, the image processor 2b generates the X-ray phase contrast image 32 based on the second X-ray image 31 stored in the storage 2c and the captured first X-ray image 30.

As shown in FIG. 12, when the second X-ray image 31 has exceeded the expiration period 41, the information 50 prompting update of the second X-ray image 31 is displayed in the imaging condition setting screen 5. At this time, the user can confirm the image quality of the X-ray phase contrast image 32 generated using the second X-ray image 31 that has exceeded the expiration period 41 by performing preview imaging, for example. When the image quality of the X-ray phase contrast image 32 generated using the second X-ray image 31 that has exceeded the expiration period 41 falls within a user's allowable range, the user can continue imaging of the first X-ray image 30 and a generation process of the X-ray phase contrast image 32 without updating the second X-ray image 31. When the image quality of the X-ray phase contrast image 32 generated using the second X-ray image 31 that has exceeded the expiration period 41 does not fall within the user's allowable range, the user can update the second X-ray image 31. The preview imaging refers to imaging in which the number of times of integration is reduced and the X-ray phase contrast image 32 is generated in a short period of time.

Notification that X-Ray Phase Contrast Image Cannot be Generated

Depending on the angles of the gratings selected by the user using the grating angle selection field 5a and the option in the imaging mode selection field 5b (see FIG. 11), the X-ray phase contrast image 32 may not be generated. Specifically, when the relative angle 40a corresponding to the angles of the gratings selected by the user and the second X-ray image 31 corresponding to the relative angle 40*a* in the imaging mode 40*b* are not stored in the storage 2*c*, the image processor 2*b* cannot generate the X-ray phase contrast image 32. Therefore, in this embodiment, the determiner 21 determines whether or not the second X-ray image 31 corresponding to the relative angle 40*a* has been stored in the storage 2*c*. When the imaging mode 40*b* selected by the user includes a plurality of relative angles 40*a*, the determiner 21 determines whether or not the corresponding second X-ray image 31 has been stored in the storage 2*c* for each of the plurality of relative angles 40*a* of the first X-ray images 30 to be acquired.

Figure 13:
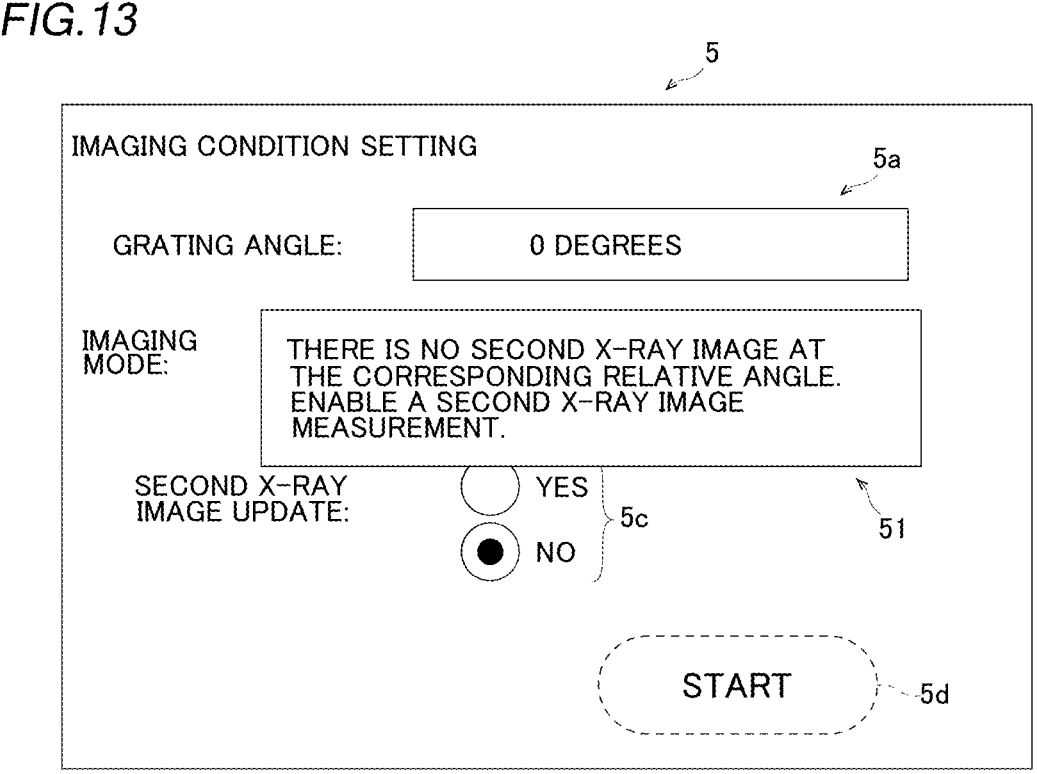
FIG. 13 is a schematic view for illustrating a screen example in which information indicating that the X-ray phase contrast image cannot be generated is displayed.

As shown in FIG. 13, when there is a relative angle 40*a* for which the corresponding second X-ray image 31 has not been stored in the storage 2*c* among the plurality of relative angles 40*a* of the first X-ray images 30 to be acquired, the display 3 notifies the user that the X-ray phase contrast image 32 cannot be generated. In other words, when there is a relative angle 40*a* for which the corresponding second X-ray image 31 has not been stored in the storage 2*c* among the plurality of relative angles 40*a* of the first X-ray images 30 to be acquired, the controller 2*a* notifies the user that it is necessary to generate the second X-ray image 31 corresponding to the relative angle 40*a*. Specifically, the display 3 displays information 51 indicating that the second X-ray image 31 cannot be generated under the control of the controller 2*a*. In this embodiment, the display 3 displays the information 51 indicating that the second X-ray image 31 cannot be generated in a pop-up format.

The image generation controller 22 performs a control such that the X-ray phase contrast image 32 cannot be generated when there is a relative angle 40*a* for which the corresponding second X-ray image 31 has not been stored in the storage 2*c* among the plurality of relative angles 40*a*. Specifically, when there is a relative angle 40*a* for which the corresponding second X-ray image 31 has not been stored in the storage 2*c* among the plurality of relative angles 40*a*, the image generation controller 22 performs a control to disable the start button 5*d* to be operated (pressed). In an example shown in FIG. 13, the start button 5*d* is indicated by a dashed line to indicate that the start button 5*d* cannot be pressed. When there is a relative angle 40*a* for which the corresponding second X-ray image 31 has not been stored in the storage 2*c* among the plurality of relative angles 40*a*, the controller 2*a* displays the information 51 indicating that the second X-ray image 31 cannot be generated before performing a control to disable the start button 5*d* to be operated.

The image generation controller 22 performs a control to enable the start button 5*d* to be pressed when the user selects "YES" for the second X-ray image update mode.

The information 51 indicating that the second X-ray image 31 cannot be generated is hidden when the start button 5*d* is pressed after the pop-up window is closed by a user's operation or the user selects "YES" for the second X-ray image update mode.

X-Ray Phase Contrast Image Generation Process

Figure 14:
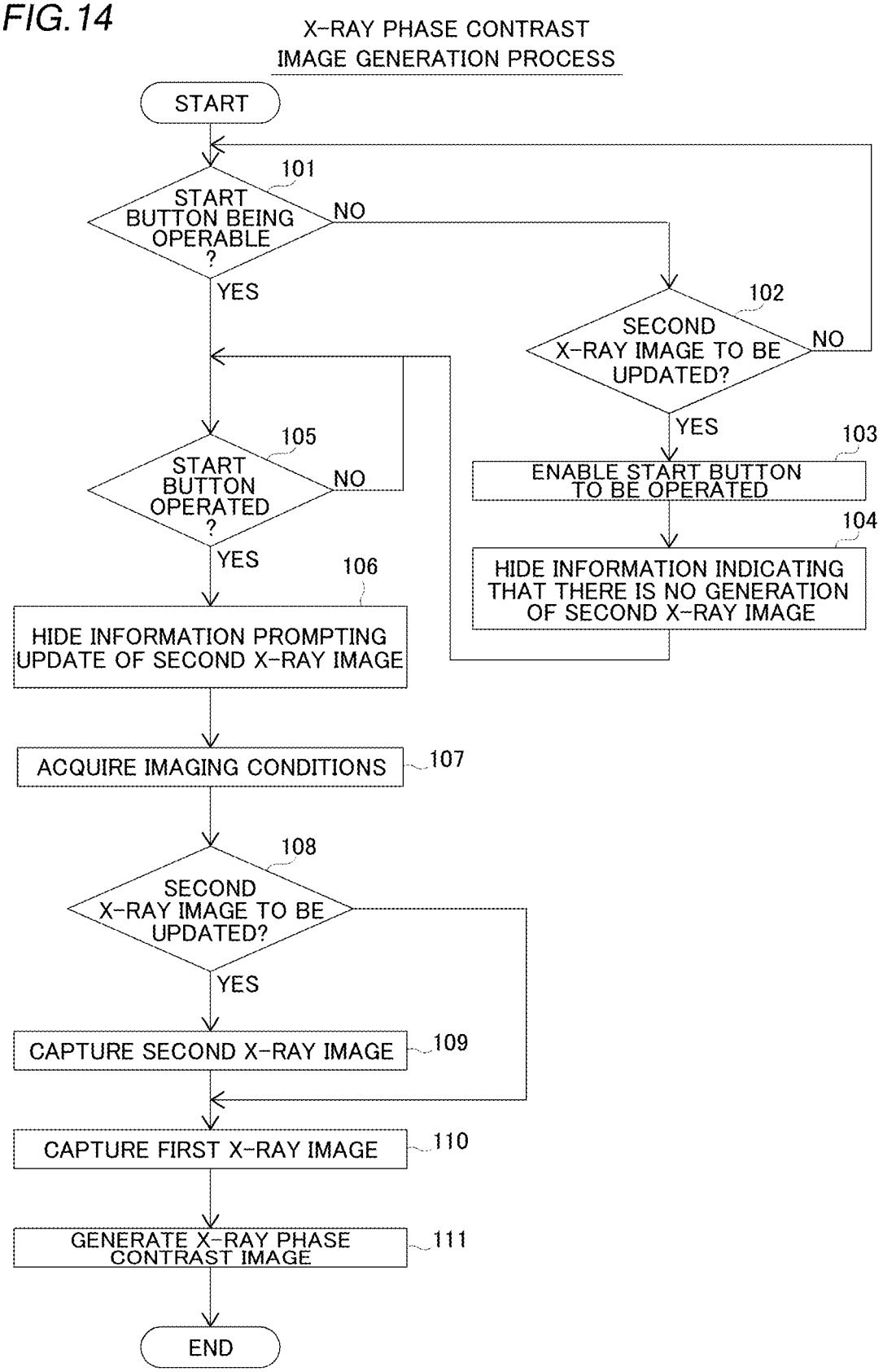
FIG. 14 is a flowchart for illustrating a process in which a controller and the image processor according to the embodiment generate the X-ray phase contrast image.

A process in which the controller 2*a* and the image processor 2*b* according to this embodiment generate the X-ray phase contrast image 32 is now described with reference to FIG. 14.

In step 101, the controller 2*a* determines whether or not the start button 5*d* is operable. When the controller 2*a* determines that the start button 5*d* is not operable, the process advances to step 102. When the controller 2*a* determines that the start button 5*d* is operable, the process advances to step 105.

In step 102, the controller 2*a* determines whether or not the second X-ray image 31 is to be updated. Specifically, the controller 2*a* determines whether or not "YES" has been selected in the second X-ray image update mode selection field 5*c*. When the controller 2*a* determines that "YES" has not been selected in the second X-ray image update mode selection field 5*c*, the process advances to step 101. When the controller 2*a* determines that "YES" has been selected in the second X-ray image update mode selection field 5*c*, the process advances to step 103.

In step 103, the image generation controller 22 performs a control to enable the start button 5*d* to be operated.

Then, in step 104, the controller 2*a* performs a control to hide the information 51 (see FIG. 13) indicating that the corresponding second X-ray image 31 does not exist. Specifically, the controller 2*a* performs a control to close the pop-up window displaying the information 51 indicating that the corresponding second X-ray image 31 does not exist. Then, the process advances to step 105.

In step 105, the controller 2*a* determines whether or not the start button 5*d* has been operated. When the controller 2*a* determines that the start button 5*d* has not been operated, the process operation in step 105 is repeated. When the controller 2*a* determines that the start button 5*d* has been operated, the process advances to step 106.

In step 106, the controller 2*a* performs a control to hide the information 50 (see FIG. 12) prompting update of the second X-ray image 31. Specifically, the controller 2*a* performs a control to close the pop-up window displaying the information 50 prompting update of the second X-ray image 31.

In step 107, the controller 2*a* acquires the imaging conditions 40. Specifically, the controller 2*a* acquires the relative angle 40*a* corresponding to the tube voltage of the X-ray source 10, the tube current of the X-ray source 10, the X-ray exposure time, the number of times of integration of the first X-ray image 30 and the second X-ray image 31, the angles of the gratings selected by using the grating angle selection field 5*a* (initial relative angle 40*a*), and the directions of the gratings selected by using the imaging mode selection field 5*b* as the imaging conditions 40.

In step 108, the controller 2*a* determines whether or not the second X-ray image 31 is to be updated. Specifically, the determiner 21 determines whether or not "YES" has been selected in the second X-ray image update mode selection field 5*c*. When the controller 2*a* determines that "YES" has not been selected in the second X-ray image update mode selection field 5*c*, the process advances to step 110. When the controller 2*a* determines that "YES" has been selected in the second X-ray image update mode selection field 5*c*, the process advances to step 109.

In step 109, the image acquirer 20 (see FIG. 1) captures the second X-ray image 31 corresponding to the imaging conditions 40. Specifically, the image acquirer 20 captures the second X-ray image 31 corresponding to the relative angle 40*a* included in the imaging conditions 40 by controlling the X-ray source 10 and the rotation mechanism 15.

In step 110, the image acquirer 20 captures the first X-ray image 30 corresponding to the imaging conditions 40. Specifically, the image acquirer 20 captures the first X-ray image 30 corresponding to the relative angle 40*a* included in the imaging conditions 40 by controlling the X-ray source 10 and the rotation mechanism 15.

In step 111, the image processor 2*b* generates the X-ray phase contrast image 32. Specifically, the image processor 2*b* generates the X-ray phase contrast image 32 based on the first X-ray image 30 and the second X-ray image 31. When the process advances from step 108 to step 109, the image processor 2b generates the X-ray phase contrast image 32 based on the second X-ray image 31 acquired in step 109 and the first X-ray image 30 acquired in step 110. When the process advances from step 108 to step 110, the image processor 2b generates the X-ray phase contrast image 32 based on the first X-ray image 30 acquired in step 110 and the second X-ray image 31 stored in the storage 2c. After that, the process is terminated.

The controller 2a stores the second X-ray image 31 captured in step 109 in the storage 2c. That is, the controller 2a updates the second X-ray image 31.

Second X-Ray Image Measurement Notification Process

Figure 15:
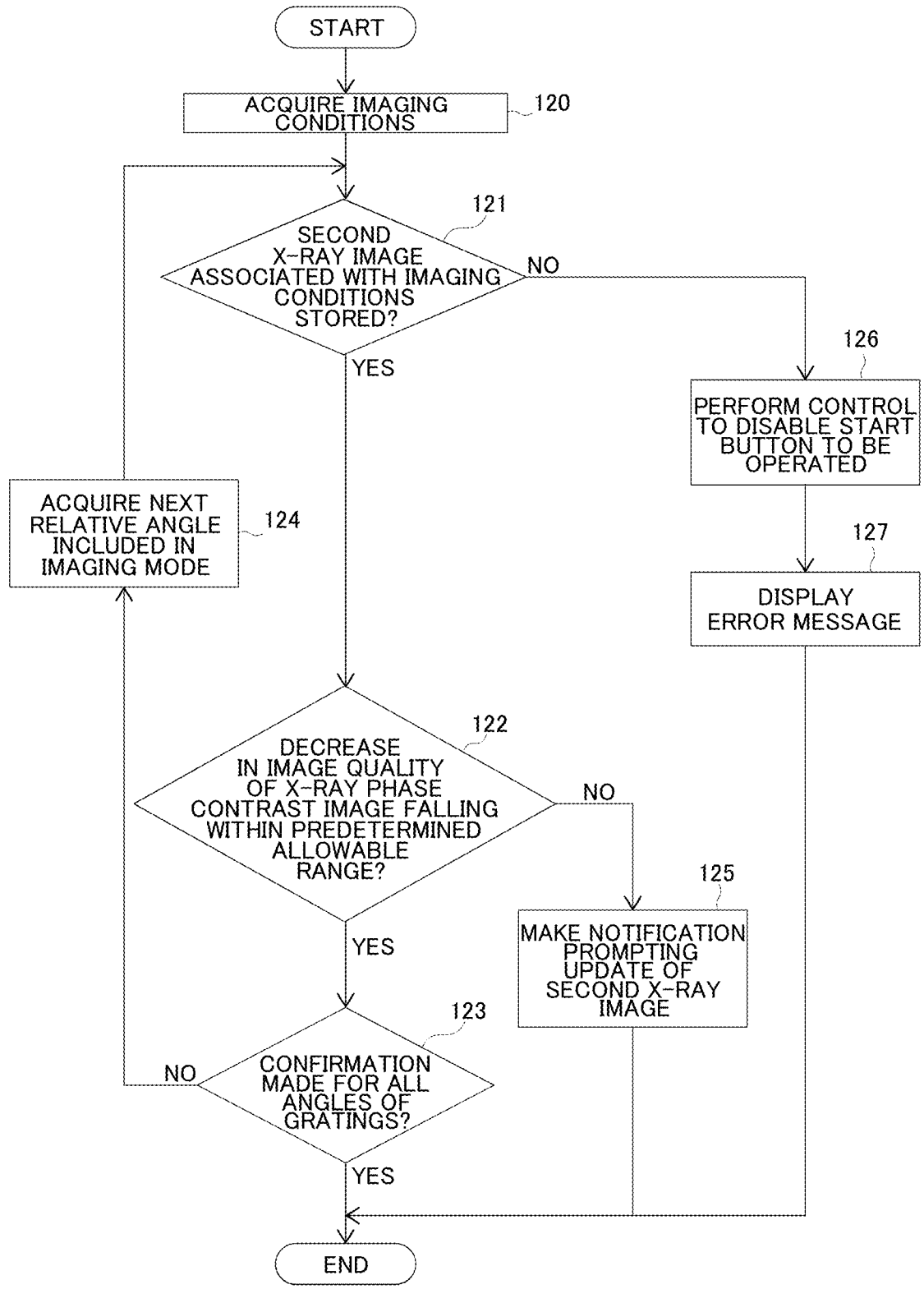
FIG. 15 is a flowchart for illustrating a process in which the controller according to the embodiment notifies a user that the second X-ray image is to be measured.

A process in which the controller 2a according to this embodiment notifies the user that the second X-ray image 31 is to be measured is now described with reference to FIG. 15.

In step 120, the controller 2a acquires the imaging conditions 40. Specifically, the controller 2a acquires the relative angle 40a corresponding to the tube voltage of the X-ray source 10, the tube current of the X-ray source 10, the X-ray exposure time, the number of times of integration of the first X-ray image 30 and the second X-ray image 31, the angles of the gratings selected by using the grating angle selection field 5a (initial relative angle 40a), and the directions of the gratings selected by using the imaging mode selection field 5b as the imaging conditions 40.

In step 121, the controller 2a (determiner 21) determines whether or not the second X-ray image 31 associated with the imaging conditions 40 of the first X-ray image 30 to be acquired has been stored in the storage 2c. Specifically, the controller 2a determines whether or not the tube voltage of the X-ray source 10, the tube current of the X-ray source 10, and the X-ray exposure time at the time of capturing the second X-ray image 31 stored in the storage 2c match the tube voltage of the X-ray source 10, the tube current of the X-ray source 10, and the X-ray exposure time at the time of capturing the first X-ray image 30, and the second X-ray image 31 at the corresponding relative angle 40a has been stored in the storage 2c. When the controller 2a determines that the tube voltage of the X-ray source 10, the tube current of the X-ray source 10, and the X-ray exposure time at the time of capturing the second X-ray image 31 stored in the storage 2c match the tube voltage of the X-ray source 10, the tube current of the X-ray source 10, and the X-ray exposure time at the time of capturing the first X-ray image 30, and the second X-ray image 31 at the corresponding relative angle 40a has been stored in the storage 2c, the process advances to step 122. When the controller 2a determines that the tube voltage of the X-ray source 10, the tube current of the X-ray source 10, and the X-ray exposure time at the time of capturing the second X-ray image 31 stored in the storage 2c match the tube voltage of the X-ray source 10, the tube current of the X-ray source 10, and the X-ray exposure time at the time of capturing the first X-ray image 30, but the second X-ray image 31 at the corresponding relative angle 40a has not been stored in the storage 2c, the process advances to step 126.

In step 122, the determiner 21 determines whether or not a decrease in the image quality of the X-ray phase contrast image 32 generated using the second X-ray image 31 stored in the storage 2c and associated with the imaging conditions 40 of the first X-ray image 30 to be acquired falls within the predetermined allowable range. Specifically, the determiner 21 determines whether or not the second X-ray image 31 stored in the storage 2c has exceeded the expiration period 41. When the determiner 21 determines that the decrease in the image quality of the X-ray phase contrast image 32 falls within the predetermined allowable range, the process advances to step 123. When the determiner 21 determines that the decrease in the image quality of the X-ray phase contrast image 32 does not fall within the predetermined allowable range, the process advances to step 125.

In step 123, the determiner 21 determines whether or not a determination has been made by itself for all angles (all relative angles 40a) of the gratings included in the imaging mode 40b. When the determiner 21 determines that a determination has been made by itself for all the angles of the gratings, the process is terminated. When the determiner 21 determines that a determination has not been made by itself for all the angles of the gratings, the process advances to step 124.

In step 124, the controller 2a acquires the next relative angle 40a included in the imaging mode 40b. After that, the process advances to step 122.

When the process advances from step 122 to step 125, the controller 2a controls the display 3 to make a notification prompting update of the second X-ray image 31 in step 125. Specifically, when the decrease in the image quality of the X-ray phase contrast image 32 does not fall within the allowable range, the controller 2a controls the display 3 to display the information 50 (see FIG. 12) prompting update of the second X-ray image 31. After that, the process is terminated.

When the process advances from step 121 to step 126, the image generation controller 22 performs a control such that the X-ray phase contrast image 32 cannot be generated in step 126. Specifically, when there is a relative angle 40a for which the corresponding second X-ray image 31 has not been stored in the storage 2c among the plurality of relative angles 40a, the image generation controller 22 performs a control to disable the start button 5d to be pressed on the imaging condition setting screen 5 (see FIG. 12).

Then, in step 127, the controller 2a controls the display 3 to display an error message. Specifically, the controller 2a performs a control to display the information 51 (see FIG. 12) indicating that the second X-ray image 31 cannot be generated, i.e., information prompting generation of the second X-ray image 31 on the display 3. After that, the process is terminated.

As described above, in this embodiment, when even one second X-ray image 31 at the relative angle 40a corresponding to the imaging mode 40b is not stored in the storage 2c, the error message is displayed. Furthermore, the start button 5d is disabled to be operated, and the process is terminated. When even one of the second X-ray images 31 at the relative angles 40a corresponding to the imaging mode 40b has exceeded the expiration period 41, the information 50 prompting update of the second X-ray image 31 is displayed on the display 3, and the process is terminated. When there are all the second X-ray images 31 at the relative angles 40a corresponding to the imaging mode 40b and none of the second X-ray images 31 has exceeded the expiration period 41, a notification is not made on the display 3. The process operations in step 120 to step 127 are performed independently of the generation process of the X-ray phase contrast image 32 shown in FIG. 14.

Advantages of this Embodiment

According to this embodiment, the following advantages are obtained.

According to this embodiment, as described above, the X-ray phase imaging apparatus 100 includes the X-ray source 10 configured to emit X-rays, the X-ray detector 11 configured to detect the X-rays emitted from X-ray source 10, the plurality of gratings arranged between the X-ray source 10 and the X-ray detector 11, the image processor 2b configured to acquire the first X-ray image 30 obtained by imaging the subject 90 according to the set imaging conditions 40 and the second X-ray image 31 obtained by imaging without the subject 90 arranged according to the set imaging conditions 40, and generate the X-ray phase contrast image 32 based on the first X-ray image 30 and the second X-ray image 31, the storage 2c configured to store the second X-ray image 31 generated by the image processor 2b in association with the imaging conditions 40, and the computer 2 (control device). The computer 2 (control device) is configured or programmed to determine whether or not a decrease in the image quality of the X-ray phase contrast image 32 generated using the second X-ray image 31 stored in the storage 2c and associated with the imaging conditions 40 of the first X-ray image 30 to be acquired falls within the predetermined allowable range and/or whether or not the second X-ray image 31 associated with the imaging conditions 40 of the first X-ray image 30 to be acquired has been stored in the storage 2c, and make a notification prompting the user to update or generate the second X-ray image 31 corresponding to the imaging conditions 40 of the first X-ray image 30 to be acquired when determining that the decrease in the image quality of the X-ray phase contrast image 32 generated using the second X-ray image 31 associated with the imaging conditions 40 of the first X-ray image 30 to be acquired does not fall within the allowable range and/or determining that the second X-ray image 31 associated with the imaging conditions 40 of the first X-ray image 30 to be acquired has not been stored in the storage 2c.

Accordingly, when it is determined that the decrease in the image quality of the X-ray phase contrast image 32 does not fall within the allowable range, a notification prompting the user to update the second X-ray image 31 is made. Therefore, the notification allows the user to understand that the second X-ray image 31 needs to be updated. When it is determined that the second X-ray image 31 associated with the imaging conditions 40 of the first X-ray image 30 to be acquired has not been stored in the storage 2c, a notification prompting the user to generate the second X-ray image 31 corresponding to the imaging conditions 40 of the first X-ray image 30 to be acquired is made. This allows the user to understand that the second X-ray image 31 needs to be generated. Consequently, the user can easily know the timing of updating the second X-ray image 31 and/or the need to generate the second X-ray image 31. Furthermore, the user is allowed to know the timing of updating the second X-ray image 31 such that a decrease in the image quality of the X-ray phase contrast image 32 out of the allowable range can be expected to be reduced or prevented by the user performing update of the second X-ray image 31. Moreover, the user is allowed to know the need to generate the second X-ray image 31 such that the inability to generate the X-ray phase contrast image 32 can be expected to be prevented by the user performing generation of the second X-ray image 31.

According to this embodiment, as described above, the X-ray phase imaging method is for generating the X-ray phase contrast image 32 based on the first X-ray image 30 obtained by imaging the subject 90 according to the set imaging conditions 40 and the second X-ray image 31 obtained by imaging without the subject 90 arranged according to the set imaging conditions 40, and includes determining whether or not a decrease in the image quality of the X-ray phase contrast image 32 generated using the second X-ray image 31 stored in the storage 2c and associated with the imaging conditions 40 of the first X-ray image 30 to be acquired falls within the predetermined allowable range and/or whether or not the second X-ray image 31 associated with the imaging conditions 40 of the first X-ray image 30 to be acquired has been stored in the storage 2c, and making a notification prompting the user to update or generate the second X-ray image 31 corresponding to the imaging conditions 40 of the first X-ray image 30 to be acquired when it is determined that the decrease in the image quality of the X-ray phase contrast image 32 generated using the second X-ray image 31 associated with the imaging conditions 40 of the first X-ray image 30 to be acquired does not fall within the allowable range and/or it is determined that the second X-ray image 31 associated with the imaging conditions 40 of the first X-ray image 30 to be acquired has not been stored in the storage 2c.

Accordingly, it is possible to provide the X-ray phase imaging method that enables the user to easily know the timing of updating the second X-ray image 31 and/or the need to generate the second X-ray image 31, similarly to the X-ray phase imaging apparatus 100 according to the embodiment described above.

In the embodiment described above, with the following configurations, the following advantages are further obtained.

That is, according to this embodiment, as described above, the determiner 21 (control device) is configured or programmed to determine whether or not the second X-ray image 31 has exceeded the preset expiration period 41 as an indicator of whether or not a decrease in the image quality of the X-ray phase contrast image 32 falls within the allowable range. Accordingly, for example, unlike a configuration in which the user determines whether or not a decrease in the image quality of the X-ray phase contrast image 32 falls within the allowable range by determining the image quality of the X-ray phase contrast image 32, the determiner 21 can determine whether or not a decrease in the image quality of the X-ray phase contrast image 32 falls within the allowable range based on the expiration period 41 of the second X-ray image 31. Consequently, regardless of the user's skill level, it is possible to determine whether or not a decrease in the image quality of the X-ray phase contrast image 32 falls within the allowable range.

According to this embodiment, as described above, the storage 2c is configured to store the second X-ray image 31 in association with the determination reference time 42 that is the time at which the second X-ray image 31 has been captured, and the determiner 21 (control device) is configured or programmed to determine whether or not the elapsed time from the determination reference time 42 or the length of time determined based on the cumulative number of times of imaging after the second X-ray image 31 is stored in the storage 2c has exceeded the expiration period 41. Accordingly, whether or not the second X-ray image 31 has exceeded the expiration period 41 can be determined based on the elapsed time from the determination reference time 42 or the length of time determined based on the cumulative number of times of imaging. That is, the determiner 21 can easily determine whether or not the second X-ray image 31 has exceeded the expiration period 41 by comparing the elapsed time from the determination reference time 42 or the length of time determined based on the cumulative number of times of imaging with the expiration period 41. Consequently, the determiner 21 can easily determine whether or not a decrease in the image quality of the X-ray phase contrast image 32 falls within the allowable range.

According to this embodiment, as described above, the controller 2a (control device) is configured or programmed to cause the display 3 (display device) to display the information 50 prompting update of the second X-ray image 31 when the second X-ray image 31 has exceeded the expiration period 41. Accordingly, the information 50 prompting update of the second X-ray image 31 is displayed on the display 3, and thus the user can easily visually know the timing of updating the second X-ray image 31.

According to this embodiment, as described above, the controller 2a (control device) is configured or programmed to cause the display 3 (display device) to display the information 50 prompting update of the second X-ray image 31 before the X-ray phase contrast image 32 is generated by the image processor 2b when the second X-ray image 31 has exceeded the expiration period 41. Accordingly, the user can confirm the information 50 prompting update of the second X-ray image 31 before the X-ray phase contrast image 32 is generated. Therefore, the user can select to update the second X-ray image 31 in advance when a decrease in the image quality of the X-ray phase contrast image 32 does not fall within the allowable range. Consequently, for example, unlike a configuration in which the user is notified of the information 50 prompting update of the second X-ray image 31 after the X-ray phase contrast image 32 is generated, the user can update the second X-ray image 31 in advance before the X-ray phase contrast image 32 is generated, and thus it is possible to effectively reduce or prevent generation of the X-ray phase contrast image 32, the image quality of which is decreased beyond the allowable range.

According to this embodiment, as described above, the X-ray phase imaging apparatus 100 further includes the rotation mechanisms 15 configured to relatively rotate the subject 90 and the plurality of gratings in the rotation direction about the X-ray irradiation axis 70, and the imaging conditions 40 include the relative angles 40a between the subject 90 and the plurality of gratings. Accordingly, the user is allowed to know whether or not a decrease in the image quality of the X-ray phase contrast image 32 falls within the allowable range when imaging is performed according to the imaging conditions 40 including the plurality of relative angles 40a. Therefore, it is preferable to apply the present invention to the X-ray phase imaging apparatus 100 that images the subject 90 while relatively rotating the subject 90 and the plurality of gratings in the rotation direction about the X-ray irradiation axis 70.

According to this embodiment, as described above, the controller 2a (control device) is configured or programmed to relatively rotate the subject 90 and the plurality of gratings by the rotation mechanisms 15, and acquire the first X-ray images 30 and the second X-ray images 31 captured at the plurality of relative angles 40a, the image processor 2b is configured to generate the X-ray phase contrast images 32 at the plurality of respective relative angles 40a based on the first X-ray images 30 and the second X-ray images 31 at the plurality of respective relative angles 40a, the storage 2c is configured to store the second X-ray images 31 at the plurality of respective relative angles 40a, and the controller 2a (control device) is configured or programmed to determine whether or not a decrease in the image quality of each of the X-ray phase contrast images 32 at the plurality of respective relative angles 40a using the second X-ray images 31 corresponding to the plurality of relative angles 40a of the first X-ray images 30 to be acquired falls within the allowable range. Accordingly, when there is the second X-ray image 31 at the relative angle 40a at which a decrease in the image quality of the X-ray phase contrast image 32 does not fall within the allowable range among the second X-ray images 31 corresponding to the plurality of relative angles 40a, the user can be prompted to update the second X-ray image 31. Consequently, the burden on the user can be reduced as compared with a configuration in which the user confirms whether or not each of the second X-ray images 31 corresponding to the plurality of relative angles 40a needs to be updated, for example.

According to this embodiment, as described above, the controller 2a (control device) is configured or programmed to determine whether or not the corresponding second X-ray image 31 has been stored in the storage 2c for each of the plurality of relative angles 40a of the first X-ray images 30 to be acquired, and to notify the user that the X-ray phase contrast image 32 cannot be generated when there is a relative angle 40a for which the corresponding second X-ray image 31 has not been stored in the storage 2c among the plurality of relative angles 40a of the first X-ray images 30 to be acquired. Accordingly, when the X-ray phase contrast images 32 corresponding to the plurality of relative angles 40a are generated, the user is allowed to understand that the second X-ray images 31 corresponding to the plurality of relative angles 40a have not been all captured. Consequently, the user can know in advance that it is necessary to acquire the second X-ray images 31 corresponding to the plurality of relative angles 40a in order to generate the X-ray phase contrast images 32, and thus user convenience (usability) can be improved.

According to this embodiment, as described above, the controller 2a (control device) is configured or programmed to perform a control to generate the X-ray phase contrast image 32 based on a user's operation even when it is determined that a decrease in the image quality of the X-ray phase contrast image 32 generated using the second X-ray image 31 associated with the imaging conditions 40 of the first X-ray image 30 to be acquired does not fall within the allowable range. Accordingly, for example, unlike a configuration in which the X-ray phase contrast image 32 is not generated when the decrease in the image quality of the X-ray phase contrast image 32 does not fall within the allowable range, the X-ray phase contrast image 32 is generated even when the image quality of the X-ray phase contrast image 32 is decreased. Therefore, when the user permits a decrease in the image quality of the X-ray phase contrast image 32 that does not fall within the allowable range, for example, the X-ray phase contrast image 32 can be generated without updating the second X-ray image 31. Consequently, the X-ray phase contrast image 32 is generated without updating the second X-ray image 31, and thus the imaging time can be shortened as compared with a configuration in which the X-ray phase contrast image 32 is generated after the second X-ray image 31 is updated.

According to this embodiment, as described above, the controller 2a (control device) is configured or programmed to determine whether or not a decrease in the image quality of the X-ray phase contrast image 32 falls within the allowable range at each preset time interval. In a configuration in which it is determined whether or not a decrease in the image quality of the X-ray phase contrast image 32 falls within the allowable range based on an operation input to generate the X-ray phase contrast image 32, for example, the user's operation becomes complex. Specifically, when the second X-ray image 31 is updated, the user needs to perform an operation input to update the second X-ray image 31 after the operation input to generate the X-ray phase contrast image 32, and perform an operation input to generate the X-ray phase contrast image 32 again. Therefore, as described above, it is determined whether or not a decrease in the image quality of the X-ray phase contrast image 32 falls within the allowable range at each preset time interval such that unnecessary user's operation can be reduced or prevented. Consequently, unnecessary user's operation can be reduced or prevented, and thus user convenience can be improved.

Modified Examples

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the X-ray phase imaging apparatus 100 includes only the rotation mechanisms 15 that relatively rotate the subject 90 and the plurality of gratings in the aforementioned embodiment, the present invention is not limited to this. The X-ray phase imaging apparatus may alternatively include a second rotation mechanism that relatively rotates the subject 90 and an imaging system including the X-ray source 10, the plurality of gratings, and the X-ray detector 11, and perform a CT scan.

While the controller 2a notifies the user of the information 50 prompting update of the second X-ray image 31 and terminates the process when even one of the second X-ray images 31 at the relative angles 40a corresponding to the imaging mode 40b has exceeded the expiration period 41 in the aforementioned embodiment, the present invention is not limited to this. For example, the controller may alternatively determine whether or not the second X-ray images 31 at all the relative angles 40a have exceeded the expiration period 41, and notify the user of the relative angle 40a of the second X-ray image 31 exceeding the expiration period 41.

While the controller 2a notifies the user of the information 51 indicating that the second X-ray image 31 cannot be generated and terminates the process when the second X-ray image 31 at the relative angle 40a corresponding to the imaging mode 40b is not stored in the storage 2c in the aforementioned embodiment, the present invention is not limited to this. For example, the controller may alternatively notify the user of a missing relative angle 40a in the relative angles 40a corresponding to the imaging mode 40b at which the second X-ray images 31 are to be captured.

A second X-ray image measurement notification process by a controller according to a modified example is described with reference to FIG. 16. The same process operations as those of the controller 2a according to the embodiment described above are denoted by the same reference numerals, and description thereof is omitted.

In step 120 to step 122, a controller acquires imaging conditions 40, and determines whether or not the tube voltage of an X-ray source 10, the tube current of an X-ray source 10, and the X-ray exposure time at the time of capturing a second X-ray image 31 stored in a storage 2c match the tube voltage of the X-ray source 10, the tube current of the X-ray source 10, and the X-ray exposure time at the time of capturing a first X-ray image 30, and the second X-ray image 31 of the corresponding relative angle 40a has been stored in the storage 2c. When the tube voltage of an X-ray source 10, the tube current of the X-ray source 10, and the X-ray exposure time at the time of capturing the second X-ray image 31 stored in the storage 2c match the tube voltage of the X-ray source 10, the tube current of the X-ray source 10, and the X-ray exposure time at the time of capturing the first X-ray image 30, and the second X-ray image 31 of the corresponding relative angle 40a has been stored in the storage 2c, the process advances to step 122. When the tube voltage of the X-ray source 10, the tube current of the X-ray source 10, and the X-ray exposure time at the time of capturing the second X-ray image 31 stored in the storage 2c match the tube voltage of the X-ray source 10, the tube current of the X-ray source 10, and the X-ray exposure time at the time of capturing the first X-ray image 30, but the second X-ray image 31 of the corresponding relative angle 40a has not been stored in the storage 2c, the process advances to step 126, and the controller performs a control to disable a start button 5d to be operated. After that, the process advances to step 128.

In step 128 the controller acquires a relative angle 40a at which the corresponding second X-ray image 31 has not been captured. For example, when the corresponding relative angle 40a is 45 degrees, and the second X-ray image 31 at 45 degrees has not been stored in the storage 2c, the controller acquires 45 degrees as the relative angle 40a at which the corresponding second X-ray image 31 has not been captured. After that, the process advances to step 122.

In step 122, a determiner 21 determines whether or not a decrease in the image quality of an X-ray phase contrast image 32 falls within an allowable range. When the decrease in the image quality of the X-ray phase contrast image 32 falls within the allowable range, the process advances to step 123. When the decrease in the image quality of the X-ray phase contrast image 32 does not fall within the allowable range, the process advances to step 129.

In step 129, the controller acquires the relative angle 40a at which a decrease in the image quality of the X-ray phase contrast image 32 does not fall within the allowable range. For example, when the corresponding relative angle 40a is 90 degrees, and the decrease in the image quality of the X-ray phase contrast image 32 based on the second X-ray image 31 at 90 degrees does not fall within the allowable range, the controller acquires 90 degrees as the relative angle 40a at which a decrease in the image quality of the X-ray phase contrast image 32 does not fall within the allowable range. After that, the process advances to step 123.

In step 123, the controller determines whether or not the determiner 21 has made a determination for all angles (all relative angles 40a) of gratings included in an imaging mode 40b (see FIG. 1). When the controller determines that the determiner 21 has not performed a process for all the angles of the gratings, the process advances to step 124. When the controller determines that the determiner 21 has made a determination for all the angles of the gratings, the process advances to step 130.

In step 130, the controller determines whether or not notification is required. Specifically, the controller determines whether or not there is at least one of the relative angle 40a at which the corresponding second X-ray image 31 has not been captured or the relative angle 40a at which a decrease in the image quality of the X-ray phase contrast image 32 does not fall within the allowable range in the plurality of relative angles 40a.

When the controller determines that notification is required, the process advances to step 131. When the controller determines that notification is not required, the process is terminated.

In step 131, the controller notifies the user of the relative angle 40a that is missing or at which the captured second X-ray image 31 has exceeded the expiration period 41. Specifically, when there is a relative angle 40a at which the corresponding second X-ray image 31 has not been captured in the plurality of relative angles 40a, the controller displays the relative angle 40a at which the corresponding second X-ray image 31 has not been captured on a display 3. Furthermore, when there is a relative angle 40a at which a decrease in the image quality of the X-ray phase contrast image 32 does not fall within the allowable range, the controller displays the relative angle 40a at which a decrease in the image quality of the X-ray phase contrast image 32 does not fall within the allowable range on the display 3. After that, the process is terminated.

In the modified example, when there is at least one of the relative angle 40a at which the corresponding second X-ray image 31 has not been captured or the relative angle 40a at which a decrease in the image quality of the X-ray phase contrast image 32 does not fall within the allowable range, the user is notified of the relative angle 40a at which the second X-ray image 31 is to be acquired. Consequently, the user can generate the X-ray phase contrast image and/or reduce or prevent a decrease in the image quality of the X-ray phase contrast image by acquiring only the second X-ray image 31 at the required relative angle 40a. Consequently, when the X-ray phase contrast image 32 is generated after the second X-ray image 31 is measured, the time required to generate the X-ray phase contrast image 32 can be shortened.

While the determiner 21 determines whether or not the second X-ray image 31 has exceeded the preset expiration period 41 as an indicator of whether or not the decrease in the image quality of the X-ray phase contrast image 32 falls within the allowable range in the aforementioned embodiment, the present invention is not limited to this. For example, the determiner may alternatively determine whether or not a decrease in the image quality of the X-ray phase contrast image 32 falls within the allowable range based on whether or not imaging has been performed a predetermined number of times after storing of the second X-ray image 31. The determiner 21 may use any indicator to make a determination as long as the same can determine whether or not a decrease in the image quality of the X-ray phase contrast image 32 falls within the allowable range.

While the determiner 21 determines whether or not the second X-ray image 31 has exceeded the expiration period 41 based on the elapsed time from the determination reference time 42 or the length of time determined based on the cumulative number of times of imaging after the second X-ray image 31 is stored in the storage 2c in the aforementioned embodiment, the present invention is not limited to this. For example, the determiner 21 may alternatively determine whether or not the second X-ray image 31 has exceeded the expiration period 41 based on the cumulative X-ray exposure time, the number of times the first X-ray image 30 has been captured (the number of images captured), etc. The determiner 21 may use any determination method as long as the same can determine whether or not the second X-ray image 31 has exceeded the expiration period 41.

While the notifier includes the display 3 that displays the information 50 prompting update of the second X-ray image 31 when the second X-ray image 31 has exceeded the expiration period 41 in the aforementioned embodiment, the present invention is not limited to this. For example, the notifier may alternatively make a notification prompting update of the second X-ray image 31 by light (notification light), sound (alarm), or the like. However, when light or sound is used to make a notification prompting update of the second X-ray image 31, the notification continues until the user performs an operation such as pressing the start button 5d. In this case, it may interfere with another operation of the user, for example. Therefore, the notifier is preferably the display 3 that displays the information 50 prompting update of the second X-ray image 31 when the second X-ray image 31 has exceeded the expiration period 41.

While the display 3 displays the information 50 prompting update of the second X-ray image 31 before the X-ray phase contrast image 32 is generated by the image processor 2b when the second X-ray image 31 has exceeded the expiration period 41 in the aforementioned embodiment, the present invention is not limited to this. For example, the display 3 may alternatively display the information 50 prompting update of the second X-ray image 31 while the X-ray phase contrast image 32 is being generated or after the X-ray phase contrast image 32 is generated. However, in a configuration in which the information 50 prompting update of the second X-ray image 31 is displayed during or after generation of the X-ray phase contrast image 32, the user needs to perform a selection operation in the second X-ray image update mode selection field 5c and press the start button 5d again in order to update the second X-ray image 31. Therefore, when the second X-ray image 31 has exceeded the expiration period 41, the display 3 preferably displays the information 50 prompting update of the second X-ray image 31 before the image processor 2b generates the X-ray phase contrast image 32.

While the X-ray phase imaging apparatus 100 includes the rotation mechanism 15 in the aforementioned embodiment, the present invention is not limited to this. For example, the X-ray phase imaging apparatus 100 may not include the rotation mechanism 15. In this case, the controller 2a is only required to acquire the angles (relative angles 40a) of the plurality of gratings and determine whether or not the second X-ray images 31 corresponding to the acquired relative angles 40a have been stored in the storage 2c and whether or not the corresponding second X-ray images 31 have exceeded the expiration period 41. However, when the X-ray phase imaging apparatus 100 does not include the rotation mechanism 15, some of the internal structures included in the subject 90 may not be imaged depending on the relative angles 40a between the subject 90 and the plurality of gratings. Therefore, the X-ray phase imaging apparatus 100 preferably includes the rotation mechanism 15.

While the image generation controller 22 performs a control to generate the X-ray phase contrast image 32 even when a decrease in the image quality of the X-ray phase contrast image 32 does not fall within the allowable range in the aforementioned embodiment, the present invention is not limited to this. For example, the image generation controller 22 may alternatively perform a control such that the X-ray phase contrast image 32 cannot be generated when a decrease in the image quality of the X-ray phase contrast image 32 does not fall within the allowable range. However, when the image generation controller 22 performs a control such that the X-ray phase contrast image 32 cannot be generated when a decrease in the image quality of the X-ray phase contrast image 32 does not fall within the allowable range, the X-ray phase contrast image 32 cannot be generated even when the user permits a decrease in the image quality of the X-ray phase contrast image 32. Therefore, the image generation controller 22 preferably performs a control to generate the X-ray phase contrast image 32 even when a decrease in the image quality of the X-ray phase contrast image 32 does not fall within the allowable range.

While the determiner 21 determines whether or not a decrease in the image quality of the X-ray phase contrast image 32 falls within the allowable range at each preset time interval in the aforementioned embodiment, the present invention is not limited to this. For example, the determiner 21 may alternatively determine whether or not a decrease in the image quality of the X-ray phase contrast image 32 falls within the allowable range based on a user's operation (pressing) on the start button 5d. However, in a configuration in which it is determined whether or not a decrease in the image quality of the X-ray phase contrast image 32 falls within the allowable range when the start button 5d is pressed by the user, a determination result of whether or not a decrease in the image quality of the X-ray phase contrast image 32 falls within the allowable range is obtained during or after generation of the X-ray phase contrast image 32. When the second X-ray image 31 needs to be updated, the user needs to perform a selection operation in the second X-ray image update mode selection field 5c and press the start button 5d again after the X-ray phase contrast image 32 is generated in order to update the second X-ray image 31. Therefore, the determiner 21 preferably determines whether or not a decrease in the image quality of the X-ray phase contrast image 32 falls within the allowable range at each preset time interval.

While the controller 2a determines whether or not the tube voltage of the X-ray source 10 (see FIG. 1), the tube current of the X-ray source 10, and the X-ray exposure time at the time of capturing the second X-ray image 31 stored in the storage 2c match the tube voltage of the X-ray source 10, the tube current of the X-ray source 10, and the X-ray exposure time at the time of capturing the first X-ray image 30, and the second X-ray image 31 at the corresponding relative angle 40a has been stored in the storage 2c in the aforementioned embodiment, the present invention is not limited to this. For example, the controller may alternatively determine whether or not a condition with high priority among the imaging conditions 40 is met and may not determine whether or not a condition with low priority among the imaging conditions is met. The condition with high priority is whether or not the second X-ray image 31 at the corresponding relative angle 40a has been stored in the storage 2c, for example. The condition with low priority is the tube voltage of the X-ray source 10, the tube current of the X-ray source 10, and the X-ray exposure time. That is, when the relative angle 40a of the second X-ray image 31 stored in the storage 2c matches the relative angle 40a at the time of capturing the first X-ray image 30, the tube voltage of the X-ray source 10, the tube current of the X-ray source 10, and the X-ray exposure time may not be exactly the same.

While the rotation mechanism 15 rotates the plurality of gratings in the rotation direction about the X-ray irradiation axis 70 to relatively rotate the subject 90 and the plurality of gratings in the aforementioned embodiment, the present invention is not limited to this. For example, the rotation mechanism may alternatively rotate the subject 90 in the rotation direction about the X-ray irradiation axis 70 without rotating the plurality of gratings to relatively rotate the subject 90 and the plurality of gratings.

While the subject position switching mechanism 17 switches the position of the subject 90 between the imaging position 72 and the retracted position 73 by moving the subject 90 in the Z direction in the aforementioned embodiment, the present invention is not limited to this. For example, the subject position switching mechanism may alternatively switch the position of the subject 90 between the imaging position 72 and the retracted position 73 by moving the imaging system including the X-ray source 10, the plurality of gratings, and the X-ray detector 11 in the Z direction without moving the subject 90.

While the grating position adjustment mechanism 16 can move the first grating 12 in the X direction, the Y direction, the Z direction, the rotation direction Rz, the rotation direction Rx, and the rotation direction Ry in the aforementioned embodiment, the present invention is not limited to this. In the present invention, the grating position adjustment mechanism 16 may alternatively be able to move the first grating in only one or more of the X direction, the Y direction, the Z direction, the rotation direction Rz, the rotation direction Rx, and the rotation direction Ry. Furthermore, the grating position adjustment mechanism 16 may alternatively be able to move the second grating 13 or the third grating 14. When fringe scanning is performed, the grating position adjustment mechanism 16 needs to be configured to move the gratings in a fringe scanning direction.

While the plurality of gratings include the third grating 14 to increase the coherence of X-rays emitted from the X-ray source 10 in the aforementioned embodiment, the present invention is not limited to this. When the coherence of X-rays emitted from the X-ray source 10 is high, the third grating 14 may not be included.

While the first grating 12 is used as a phase grating to form a self-image by the Talbot effect in the aforementioned embodiment, the present invention is not limited to this. In the present invention, an absorption grating may be used instead of a phase grating as long as the self-image is striped. When an absorption grating is used, a region in which fringes are simply generated depending on optical conditions such as distance (non-interferometer), and a region in which a self-image is generated by the Talbot effect (interferometer) are generated.

Aspects

It will be appreciated by those skilled in the art that the exemplary embodiments described above are specific examples of the following aspects.

(Item 1)

An X-ray phase imaging apparatus comprising:

an X-ray source configured to emit X-rays;

an X-ray detector configured to detect the X-rays emitted from the X-ray source;

a plurality of gratings arranged between the X-ray source and the X-ray detector;

an image processor configured to acquire a first X-ray image obtained by imaging a subject according to a set imaging condition and a second X-ray image obtained by imaging without the subject arranged according to the set imaging condition, and generate an X-ray phase contrast image based on the first X-ray image and the second X-ray image;

a storage configured to store the second X-ray image generated by the image processor in association with the imaging condition; and a control device configured or programmed to:

determine whether or not a decrease in an image quality of the X-ray phase contrast image generated using the second X-ray image stored in the storage, the second X-ray image being associated with the imaging condition of the first X-ray image to be acquired, falls within a predetermined allowable range and/or whether or not the second X-ray image associated with the imaging condition of the first X-ray image to be acquired has been stored in the storage; and make a notification prompting a user to update or generate the second X-ray image corresponding to the imaging condition of the first X-ray image to be acquired when determining that the decrease in the image quality of the X-ray phase contrast image generated using the second X-ray image associated with the imaging condition of the first X-ray image to be acquired does not fall within the allowable range and/or determining that the second X-ray image associated with the imaging condition of the first X-ray image to be acquired has not been stored in the storage.

(Item 2)

The X-ray phase imaging apparatus according to item 1, wherein the control device is configured or programmed to determine whether or not the second X-ray image has exceeded a preset expiration period as an indicator of whether or not the decrease in the image quality of the X-ray phase contrast image falls within the allowable range.

(Item 3)

The X-ray phase imaging apparatus according to item 2, wherein
the storage is configured to store the second X-ray image in association with determination reference time that is time at which the second X-ray image has been captured; and
the control device is configured or programmed to determine whether or not an elapsed time from the determination reference time or a length of time determined based on a cumulative number of times of imaging after the second X-ray image is stored in the storage has exceeded the expiration period.

(Item 4)

The X-ray phase imaging apparatus according to item 2, further comprising:
a display device; wherein
the control device is configured or programmed to cause the display device to display information prompting update of the second X-ray image when the second X-ray image has exceeded the expiration period.

(Item 5)

The X-ray phase imaging apparatus according to item 4, wherein the control device is configured or programmed to cause the display device to display the information prompting update of the second X-ray image before the X-ray phase contrast image is generated by the image processor when the second X-ray image has exceeded the expiration period.

(Item 6)

The X-ray phase imaging apparatus according to item 1, further comprising:
a rotation mechanism configured to relatively rotate the subject and the plurality of gratings in a rotation direction about an X-ray irradiation axis; wherein
the imaging condition includes a relative angle between the subject and each of the plurality of gratings.

(Item 7)

The X-ray phase imaging apparatus according to item 6, wherein
the imaging condition includes a plurality of relative angles between the subject and each of the plurality of gratings;
the control device is configured or programmed to relatively rotate the subject and the plurality of gratings by the rotation mechanism, and acquire first X-ray images and second X-ray images captured at the plurality of respective relative angles;
the image processor is configured to generate X-ray phase contrast images at the plurality of respective relative angles based on the first X-ray images and the second X-ray images at the plurality of respective relative angles; and
the storage is configured to store the second X-ray images at the plurality of respective relative angles; and the control device is configured or programmed to determine whether or not a decrease in an image quality of each of the X-ray phase contrast images at the plurality of respective relative angles using the second X-ray images corresponding to the plurality of relative angles of the first X-ray images to be acquired falls within the allowable range.

(Item 8)

The X-ray phase imaging apparatus according to item 6, wherein
the control device is configured or programmed to:
determine whether or not a corresponding second X-ray image has been stored in the storage for each of a plurality of relative angles of first X-ray images to be acquired; and
notify the user that the X-ray phase contrast image cannot be generated when there is a relative angle for which the corresponding second X-ray image has not been stored in the storage among the plurality of relative angles of the first X-ray images to be acquired.

(Item 9)

The X-ray phase imaging apparatus according to item 1, wherein the control device is configured or programmed to perform a control to generate the X-ray phase contrast image based on a user's operation even when it is determined that the decrease in the image quality of the X-ray phase contrast image generated using the second X-ray image associated with the imaging condition of the first X-ray image to be acquired does not fall within the allowable range.

(Item 10)

The X-ray phase imaging apparatus according to item 1, wherein the control device is configured or programmed to determine whether or not the decrease in the image quality of the X-ray phase contrast image falls within the allowable range at each preset time interval.

(Item 11)

An X-ray phase imaging method for generating an X-ray phase contrast image based on a first X-ray image obtained by imaging a subject according to a set imaging condition and a second X-ray image obtained by imaging without the subject arranged according to the set imaging condition, the X-ray phase imaging method comprising:
determining whether or not a decrease in an image quality of the X-ray phase contrast image generated using the second X-ray image stored in a storage, the second X-ray image being associated with the imaging condition of the first X-ray image to be acquired, falls within a predetermined allowable range and/or whether or not the second X-ray image associated with the imaging condition of the first X-ray image to be acquired has been stored in the storage; and
making a notification prompting a user to update or generate the second X-ray image corresponding to the imaging condition of the first X-ray image to be acquired when it is determined that the decrease in the image quality of the X-ray phase contrast image generated using the second X-ray image associated with the imaging condition of the first X-ray image to be acquired does not fall within the allowable range and/or it is determined that the second X-ray image associated with the imaging condition of the first X-ray image to be acquired has not been stored in the storage.

What is claimed is:

1. An X-ray phase imaging apparatus comprising:
   an X-ray source configured to emit X-rays;
   an X-ray detector configured to detect the X-rays emitted from the X-ray source;
   a plurality of gratings arranged between the X-ray source and the X-ray detector;
   an image processor configured to acquire a first X-ray image obtained by imaging a subject according to a set imaging condition and a second X-ray image obtained by imaging without the subject arranged according to the set imaging condition, and generate an X-ray phase contrast image based on the first X-ray image and the second X-ray image;
   a storage configured to store the second X-ray image generated by the image processor in association with the imaging condition; and
   a control device configured or programmed to:
      determine whether or not a decrease in an image quality of the X-ray phase contrast image generated using the second X-ray image stored in the storage, the second X-ray image being associated with the imaging condition of the first X-ray image to be acquired, falls within a predetermined allowable range and/or whether or not the second X-ray image associated with the imaging condition of the first X-ray image to be acquired has been stored in the storage; and
      make a notification prompting a user to update or generate the second X-ray image corresponding to the imaging condition of the first X-ray image to be acquired when determining that the decrease in the image quality of the X-ray phase contrast image generated using the second X-ray image associated with the imaging condition of the first X-ray image to be acquired does not fall within the allowable range and/or determining that the second X-ray image associated with the imaging condition of the first X-ray image to be acquired has not been stored in the storage.

2. The X-ray phase imaging apparatus according to claim 1, wherein the control device is configured or programmed to determine whether or not the second X-ray image has exceeded a preset expiration period as an indicator of whether or not the decrease in the image quality of the X-ray phase contrast image falls within the allowable range.

3. The X-ray phase imaging apparatus according to claim 2, wherein
   the storage is configured to store the second X-ray image in association with determination reference time that is time at which the second X-ray image has been captured; and
   the control device is configured or programmed to determine whether or not an elapsed time from the determination reference time or a length of time determined based on a cumulative number of times of imaging after the second X-ray image is stored in the storage has exceeded the expiration period.

4. The X-ray phase imaging apparatus according to claim 2, further comprising:
   a display device; wherein
   the control device is configured or programmed to cause the display device to display information prompting update of the second X-ray image when the second X-ray image has exceeded the expiration period.

5. The X-ray phase imaging apparatus according to claim 4, wherein the control device is configured or programmed to cause the display device to display the information prompting update of the second X-ray image before the X-ray phase contrast image is generated by the image processor when the second X-ray image has exceeded the expiration period.

6. The X-ray phase imaging apparatus according to claim 1, further comprising:
   a rotation mechanism configured to relatively rotate the subject and the plurality of gratings in a rotation direction about an X-ray irradiation axis; wherein
   the imaging condition includes a relative angle between the subject and each of the plurality of gratings.

7. The X-ray phase imaging apparatus according to claim 6, wherein
   the imaging condition includes a plurality of relative angles between the subject and each of the plurality of gratings; and
   the control device is configured or programmed to relatively rotate the subject and the plurality of gratings by the rotation mechanism, and acquire first X-ray images and second X-ray images captured at the plurality of respective relative angles;
   the image processor is configured to generate X-ray phase contrast images at the plurality of respective relative angles based on the first X-ray images and the second X-ray images at the plurality of respective relative angles;
   the storage is configured to store the second X-ray images at the plurality of respective relative angles; and
   the control device is configured or programmed to determine whether or not a decrease in an image quality of each of the X-ray phase contrast images at the plurality of respective relative angles using the second X-ray images corresponding to the plurality of relative angles of the first X-ray images to be acquired falls within the allowable range.

8. The X-ray phase imaging apparatus according to claim 6, wherein
   the control device is configured or programmed to:
      determine whether or not a corresponding second X-ray image has been stored in the storage for each of a plurality of relative angles of first X-ray images to be acquired; and
      notify the user that the X-ray phase contrast image cannot be generated when there is a relative angle for which the corresponding second X-ray image has not been stored in the storage among the plurality of relative angles of the first X-ray images to be acquired.

9. The X-ray phase imaging apparatus according to claim 1, wherein the control device is configured or programmed to perform a control to generate the X-ray phase contrast image based on a user's operation even when it is determined that the decrease in the image quality of the X-ray phase contrast image generated using the second X-ray image associated with the imaging condition of the first X-ray image to be acquired does not fall within the allowable range.

10. The X-ray phase imaging apparatus according to claim 1, wherein the control device is configured or programmed to determine whether or not the decrease in the image quality of the X-ray phase contrast image falls within the allowable range at each preset time interval.

11. An X-ray phase imaging method for generating an X-ray phase contrast image based on a first X-ray image obtained by imaging a subject according to a set imaging condition and a second X-ray image obtained by imaging without the subject arranged according to the set imaging condition, the X-ray phase imaging method comprising:

determining whether or not a decrease in an image quality of the X-ray phase contrast image generated using the second X-ray image stored in a storage, the second X-ray image being associated with the imaging condition of the first X-ray image to be acquired, falls within a predetermined allowable range and/or whether or not the second X-ray image associated with the imaging condition of the first X-ray image to be acquired has been stored in the storage; and making a notification prompting a user to update or generate the second X-ray image corresponding to the imaging condition of the first X-ray image to be acquired when it is determined that the decrease in the image quality of the X-ray phase contrast image generated using the second X-ray image associated with the imaging condition of the first X-ray image to be acquired does not fall within the allowable range and/or it is determined that the second X-ray image associated with the imaging condition of the first X-ray image to be acquired has not been stored in the storage.

* * * * *